United States Patent
Ha et al.

(10) Patent No.: US 11,703,237 B2
(45) Date of Patent: Jul. 18, 2023

(54) CONTROLLING DRYING CONDITIONS TO MAINTAIN HUMIDITY LEVELS DURING HVAC OPERATION

(71) Applicant: LG ELECTRONICS INC., Seoul (KR)

(72) Inventors: Doyong Ha, Seoul (KR); Janghee Park, Seoul (KR); Hansaem Park, Seoul (KR); Yongki Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 593 days.

(21) Appl. No.: 16/637,417

(22) PCT Filed: Aug. 6, 2018

(86) PCT No.: PCT/KR2018/008873
§ 371 (c)(1),
(2) Date: Feb. 7, 2020

(87) PCT Pub. No.: WO2019/031778
PCT Pub. Date: Feb. 14, 2019

(65) Prior Publication Data
US 2020/0182500 A1    Jun. 11, 2020

(30) Foreign Application Priority Data
Aug. 7, 2017   (KR) .................. 10-2017-0099750

(51) Int. Cl.
*F24F 11/30*    (2018.01)
*F24F 3/06*     (2006.01)
(Continued)

(52) U.S. Cl.
CPC .............. *F24F 11/30* (2018.01); *F24F 3/001* (2013.01); *F24F 3/06* (2013.01); *F24F 3/14* (2013.01);
(Continued)

(58) Field of Classification Search
None
See application file for complete search history.

(56) References Cited

U.S. PATENT DOCUMENTS

| | | | |
|---|---|---|---|
| 6,751,964 B2 * | 6/2004 | Fischer | ................ F24F 3/1423 62/271 |
| 8,348,634 B2 * | 1/2013 | Ertl | ....................... B60T 17/002 303/17 |

(Continued)

FOREIGN PATENT DOCUMENTS

| | | |
|---|---|---|
| EP | 1 757 872 | 2/2007 |
| EP | 2 216 607 | 8/2010 |

(Continued)

OTHER PUBLICATIONS

Aynur et al., "Field performance measurements of a heat pump desiccant unit in dehumidification mode", Energy and Buildings 40 (2008) 2141-2147 (Year: 2008).*

(Continued)

*Primary Examiner* — Mohammad Ali
*Assistant Examiner* — Kelvin Booker
(74) *Attorney, Agent, or Firm* — KED & Associates

(57) ABSTRACT

An air conditioner is provided. The air conditioner includes a heat exchange module, at least one humidity sensor, and a controller. The heat exchange module includes a compressor, a first heat exchanger, an expansion valve, a second heat exchanger, and an absorbent disposed on an outer surface of the first and second heat exchangers. The controller is configured to control to stop a normal operation and perform a drying operation for supplying air to any one of the first and second heat exchangers serving as an evaporator when it is determined that a predetermined drying operation condition is satisfied based on humidity information of air passed through the any one of the first and second heat exchangers serving as the evaporator, during the normal (Continued)

operation in which the any one of the first and second heat exchangers serves as an evaporator and the other serves as a condenser.

17 Claims, 13 Drawing Sheets

(51) Int. Cl.

| | | |
|---|---|---|
| *F24F 3/14* | (2006.01) | |
| *F24F 13/10* | (2006.01) | |
| *F24F 13/30* | (2006.01) | |
| *G05B 15/02* | (2006.01) | |
| *F24F 3/00* | (2006.01) | |
| *F24F 11/00* | (2018.01) | |
| *F24F 13/22* | (2006.01) | |
| *F24F 110/20* | (2018.01) | |
| *F24F 110/22* | (2018.01) | |
| *F24F 110/10* | (2018.01) | |
| *F24F 110/12* | (2018.01) | |

(52) U.S. Cl.
CPC ........ *F24F 3/1405* (2013.01); *F24F 11/0008* (2013.01); *F24F 13/10* (2013.01); *F24F 13/222* (2013.01); *F24F 13/30* (2013.01); *G05B 15/02* (2013.01); *F24F 2003/1446* (2013.01); *F24F 2110/10* (2018.01); *F24F 2110/12* (2018.01); *F24F 2110/20* (2018.01); *F24F 2110/22* (2018.01); *F24F 2221/54* (2013.01)

(56) References Cited

U.S. PATENT DOCUMENTS

| | | | | |
|---|---|---|---|---|
| 8,828,128 | B1* | 9/2014 | Parker | B01D 53/261 |
| | | | | 96/127 |
| 9,347,581 | B2* | 5/2016 | Diekmeyer | B60T 13/683 |
| 9,829,238 | B2* | 11/2017 | Unezaki | F24F 3/1405 |
| 9,885,486 | B2* | 2/2018 | Wintemute | F25B 49/02 |
| 10,260,762 | B2* | 4/2019 | Okajima | F24F 11/83 |
| 10,274,210 | B2* | 4/2019 | Wintemute | F24F 1/022 |
| 2006/0162367 | A1* | 7/2006 | Yabu | B01D 53/261 |
| | | | | 62/271 |
| 2007/0051123 | A1* | 3/2007 | Matsui | F25B 13/00 |
| | | | | 62/515 |
| 2007/0144189 | A1 | 6/2007 | Ishida et al. | |
| 2007/0157660 | A1* | 7/2007 | Lee | F24F 1/06 |
| | | | | 62/198 |
| 2007/0193287 | A1* | 8/2007 | Ishida | F25B 13/00 |
| | | | | 62/176.1 |
| 2014/0250930 | A1* | 9/2014 | Unezaki | B01D 53/261 |
| | | | | 62/271 |
| 2016/0231009 | A1* | 8/2016 | Choi | F24F 1/022 |
| 2017/0205089 | A1* | 7/2017 | Fukuhara | F24F 3/001 |
| 2017/0205092 | A1* | 7/2017 | Okajima | F24F 11/65 |

FOREIGN PATENT DOCUMENTS

| | | |
|---|---|---|
| EP | 2 693 132 | 2/2014 |
| EP | 2 896 903 | 7/2015 |
| JP | 2005-188915 | 7/2005 |
| JP | 2005-291571 | 10/2005 |
| JP | 2009-109125 | 5/2009 |
| KR | 10-2006-0121946 | 11/2006 |
| KR | 10-2013-0142259 | 12/2013 |
| KR | 10-2016-0048469 | 5/2016 |

OTHER PUBLICATIONS

Chai et al., "Experimental investigation on a fresh air dehumidification system using heat pump with desiccant coated heat exchanger", Energy 171 (2019) 306-314. (Year: 2019).*

Rafique et al., "A review on desiccant based evaporative cooling systems", Renewable and Sustainable Energy Reviews 45 (2015) 145-159. (Year: 2015).*

Hua et al., "Extremely high efficient heat pump with desiccant coated evaporator and condenser", Energy 170 (2019) 569-579. (Year: 2019).*

European Search Report issued in Application No. 18843473.2 dated Mar. 9, 2021.

International Search Report (with English Translation) and Written Opinion dated Dec. 6, 2018 issued in Application No. PCT/KR2018/008873.

* cited by examiner

[Fig. 1]
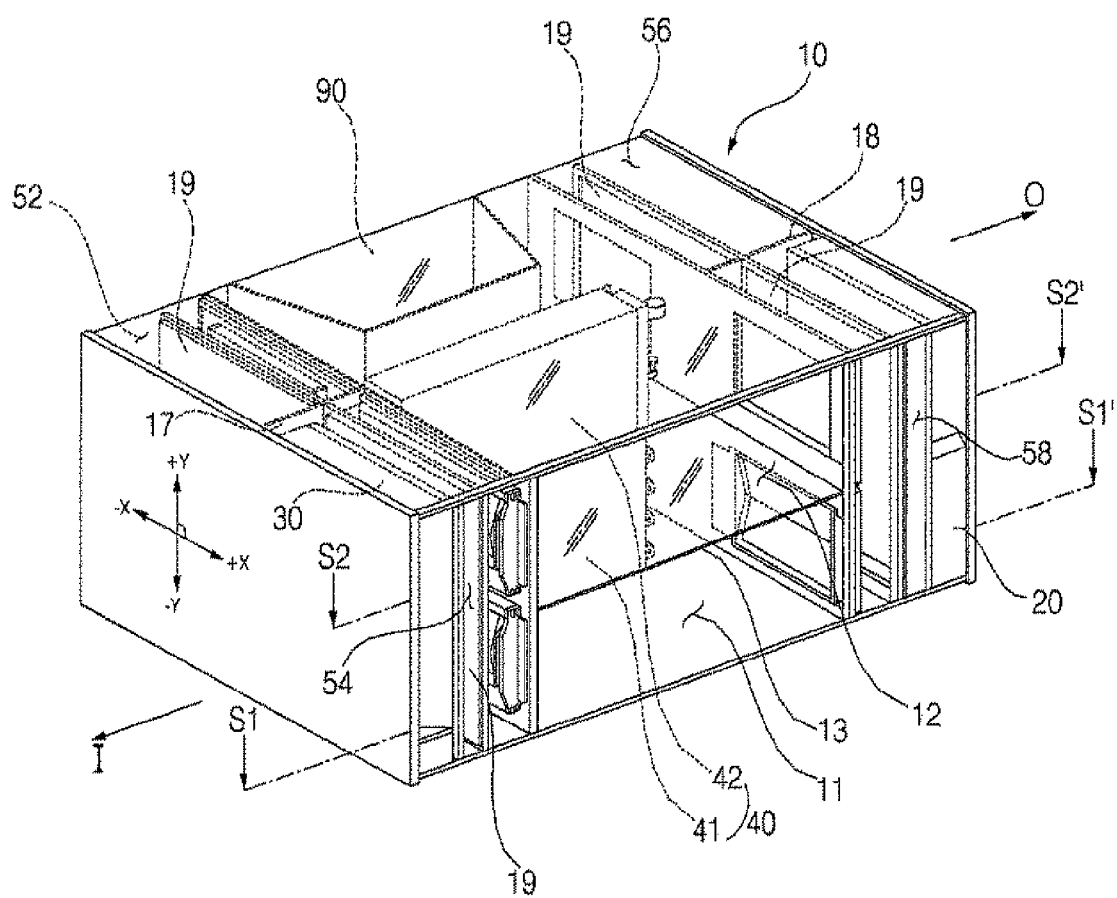

[Fig. 2]
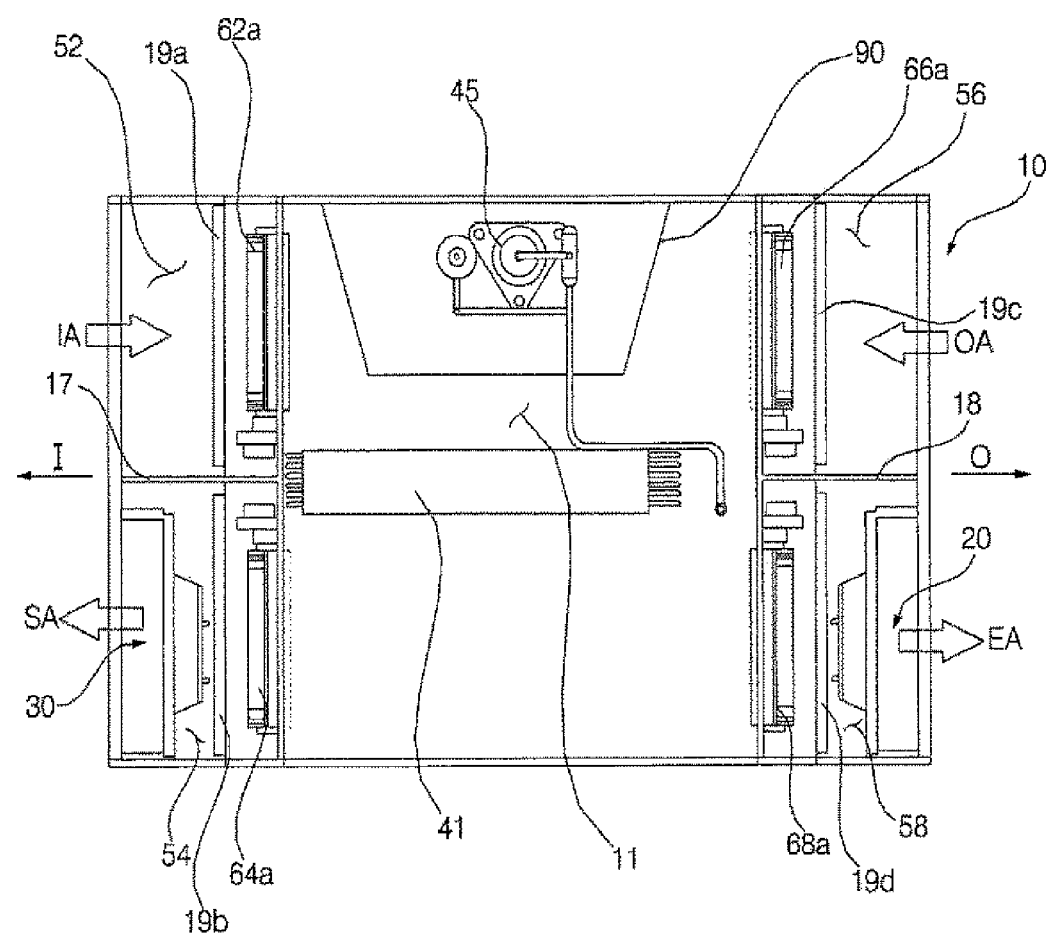

[Fig. 3]
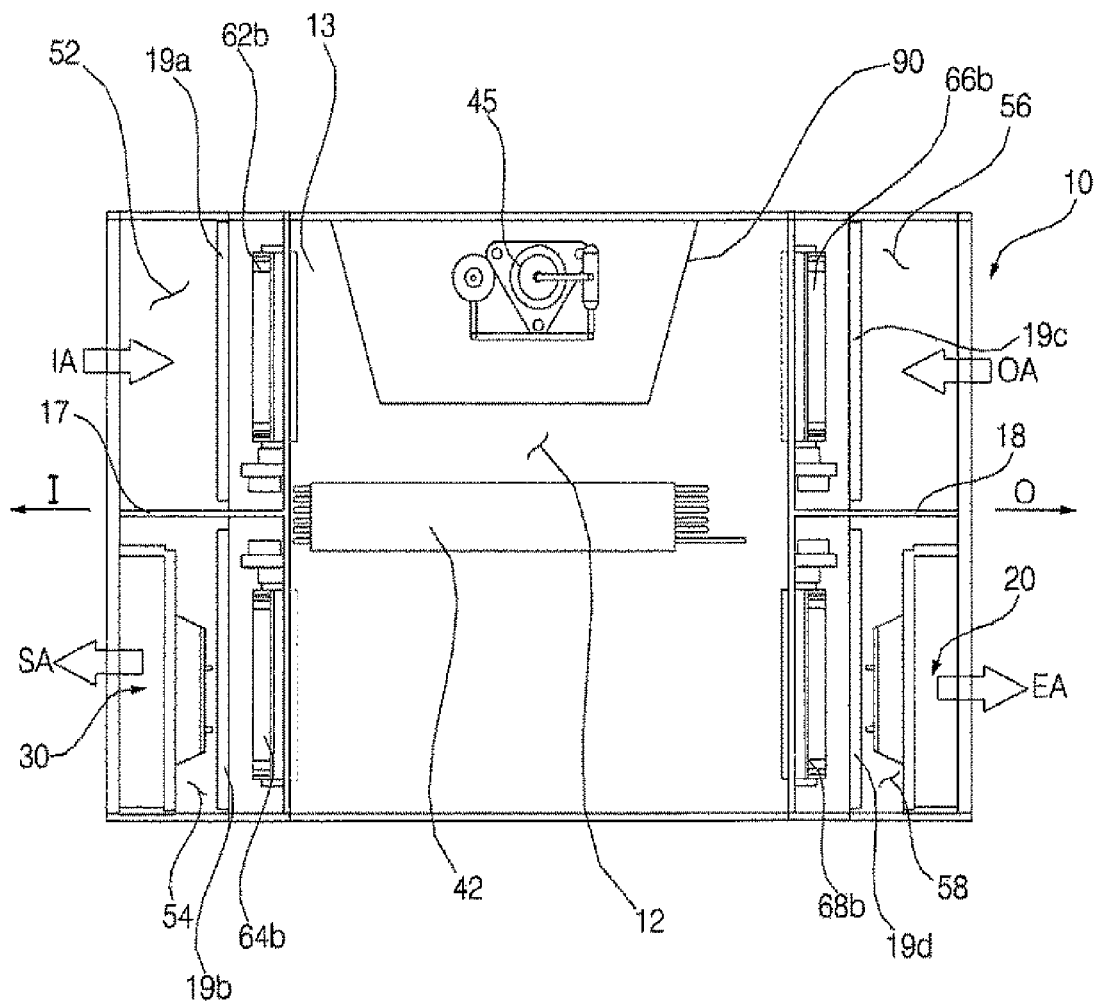

[Fig. 4a]
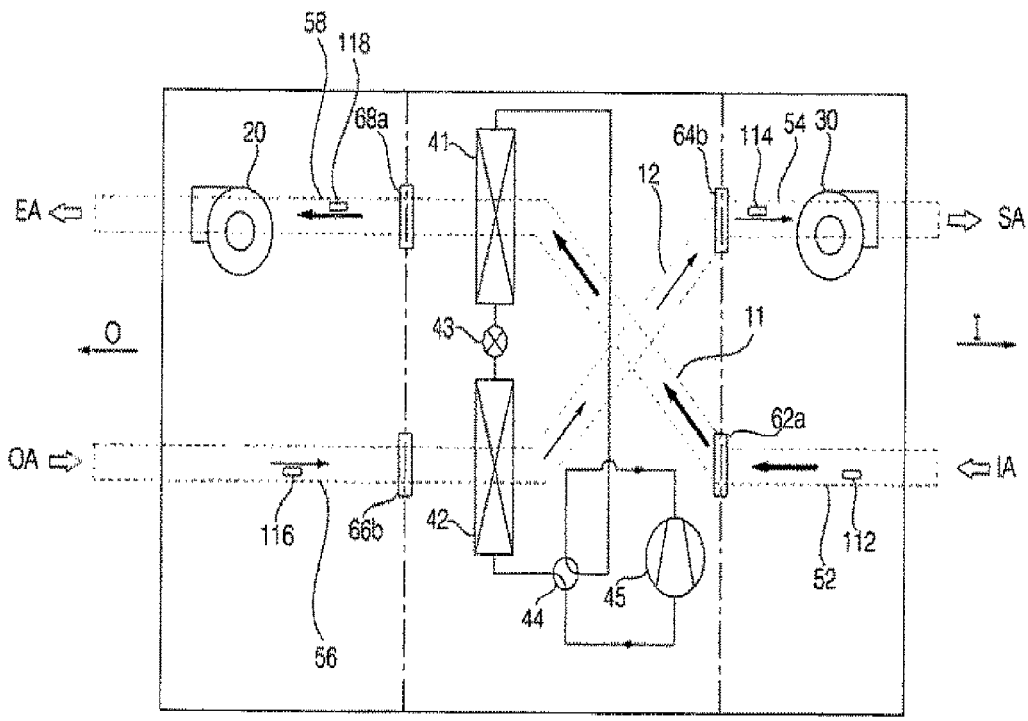
[Fig. 4b]
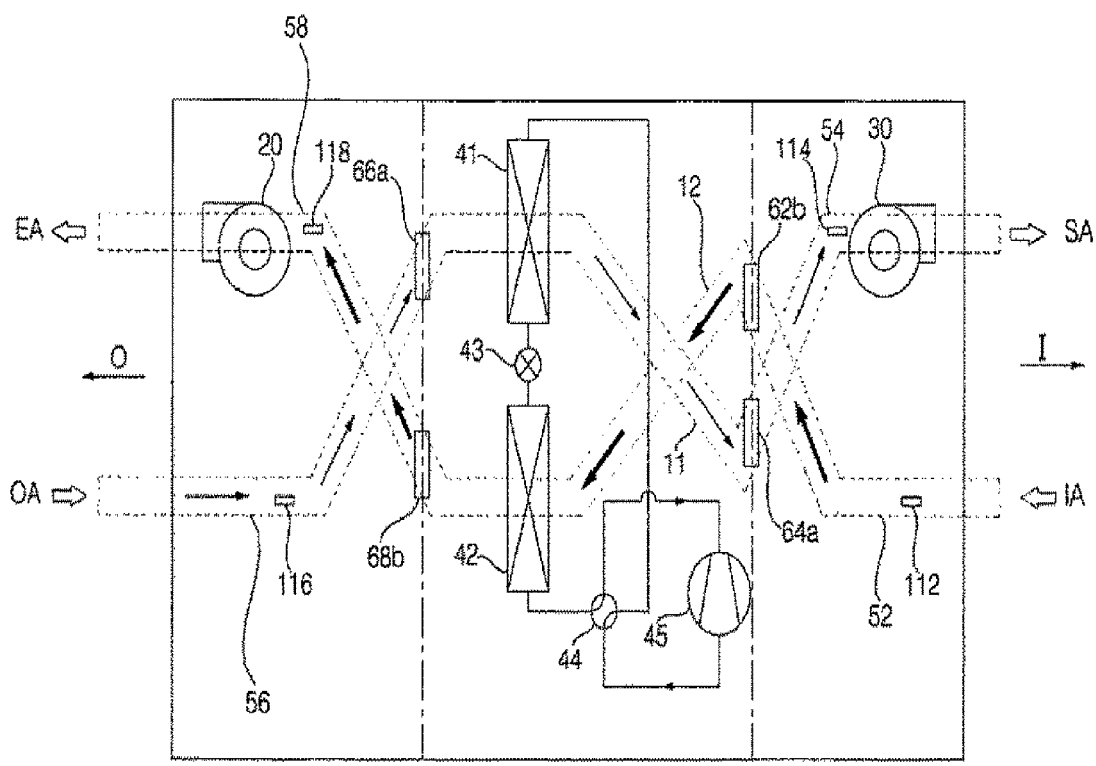

[Fig. 6a]
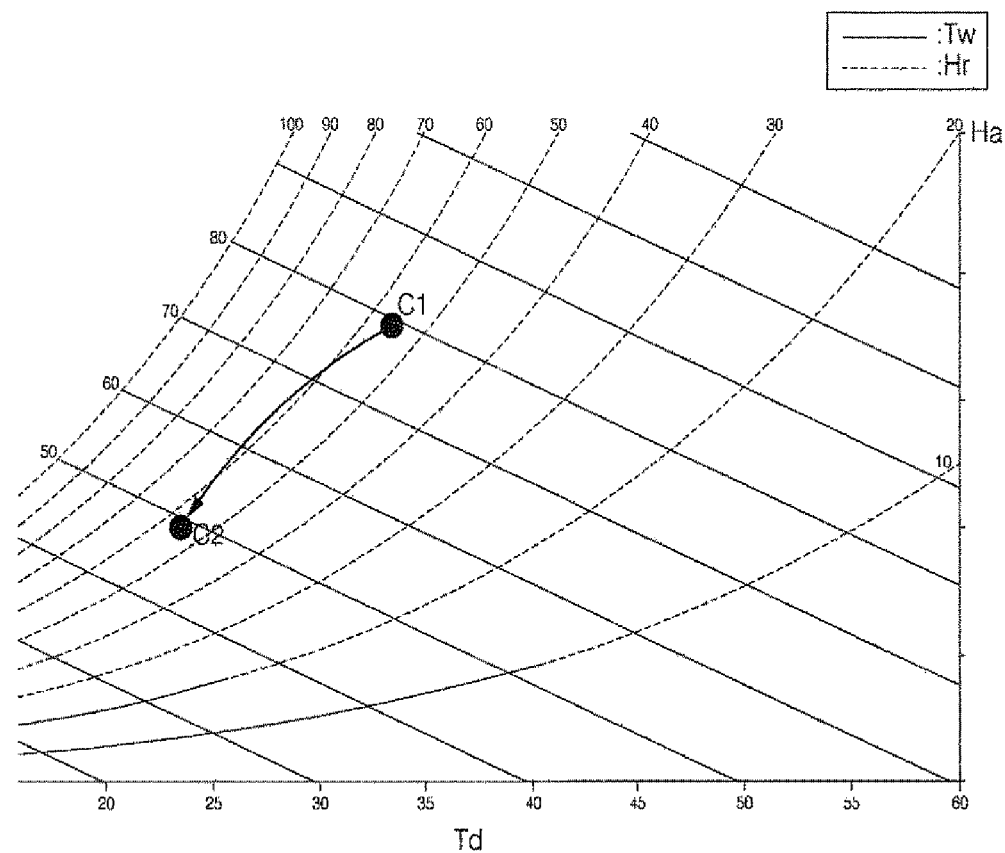
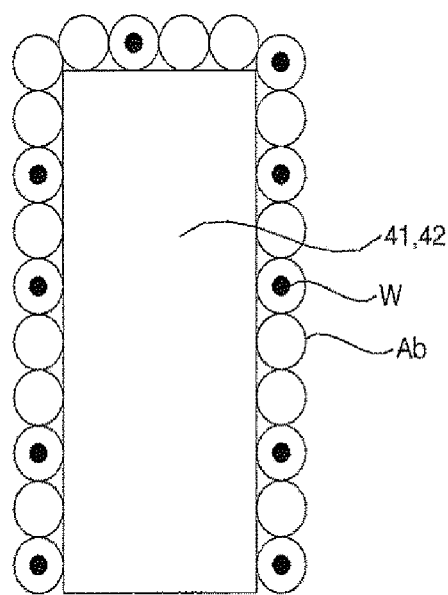

[Fig. 6b]
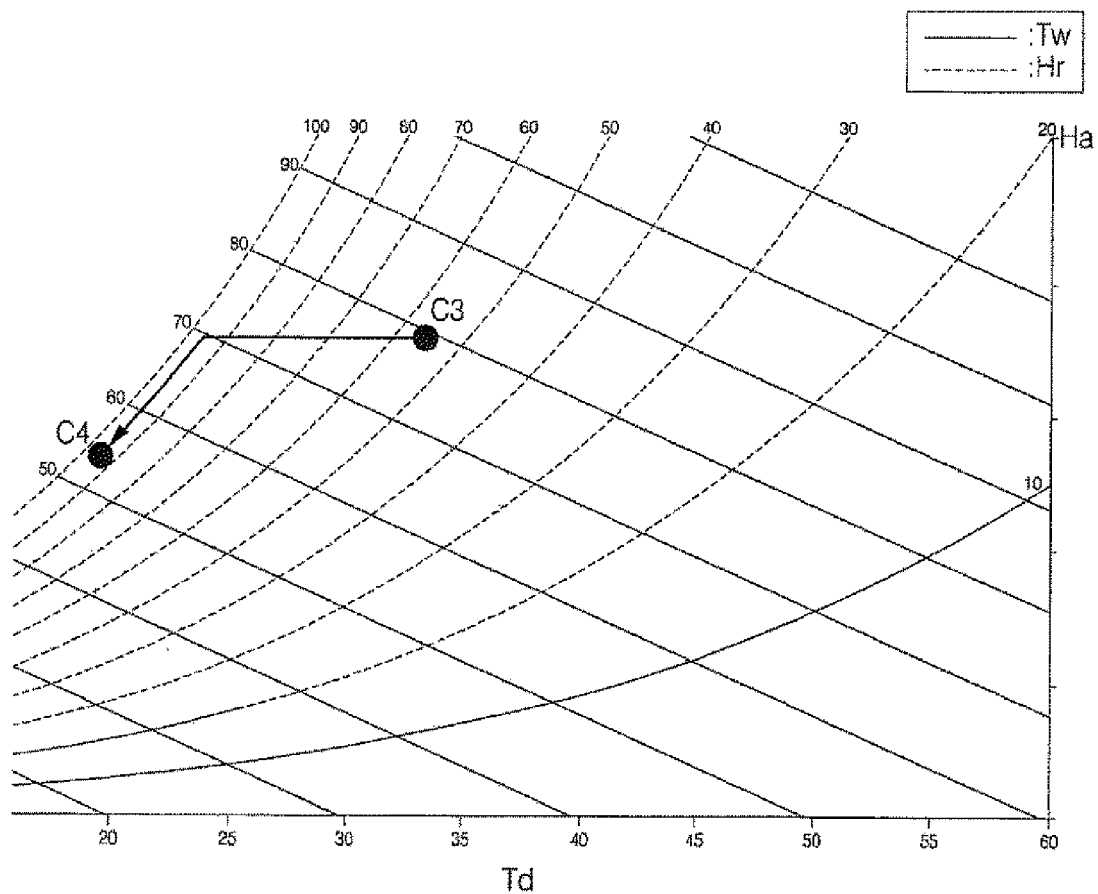
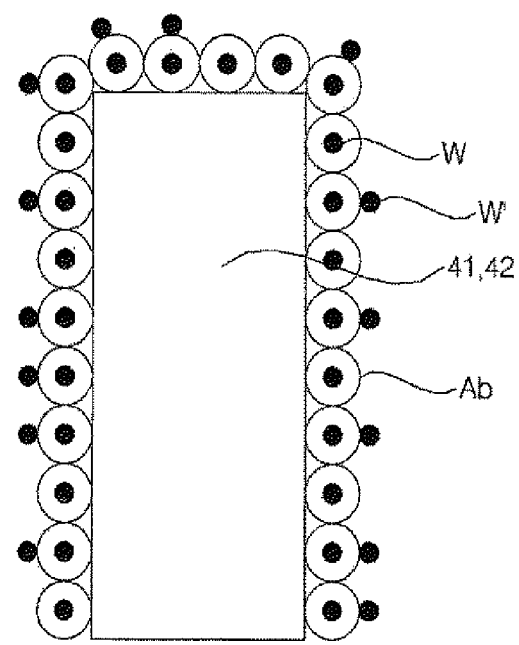

[Fig. 9a]
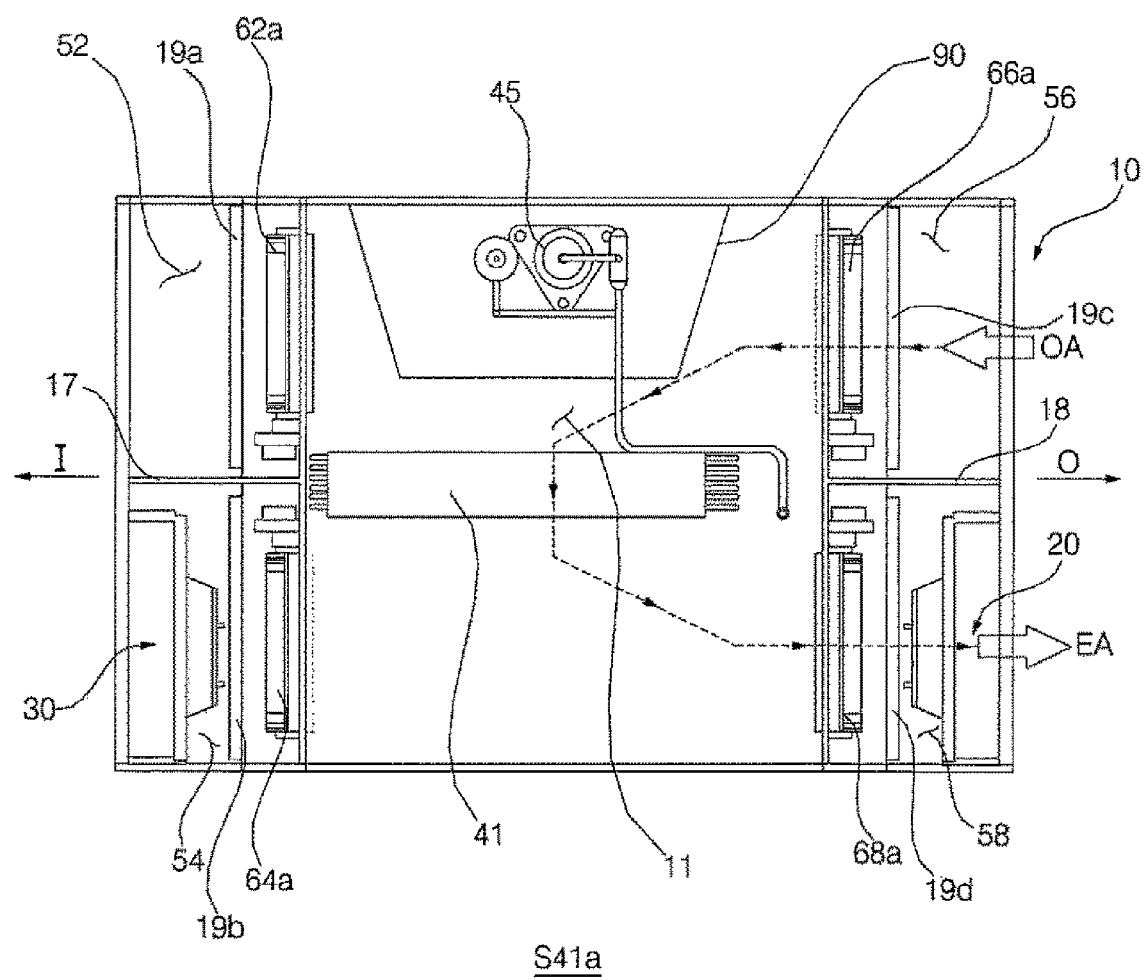
S41a

[Fig. 9b]
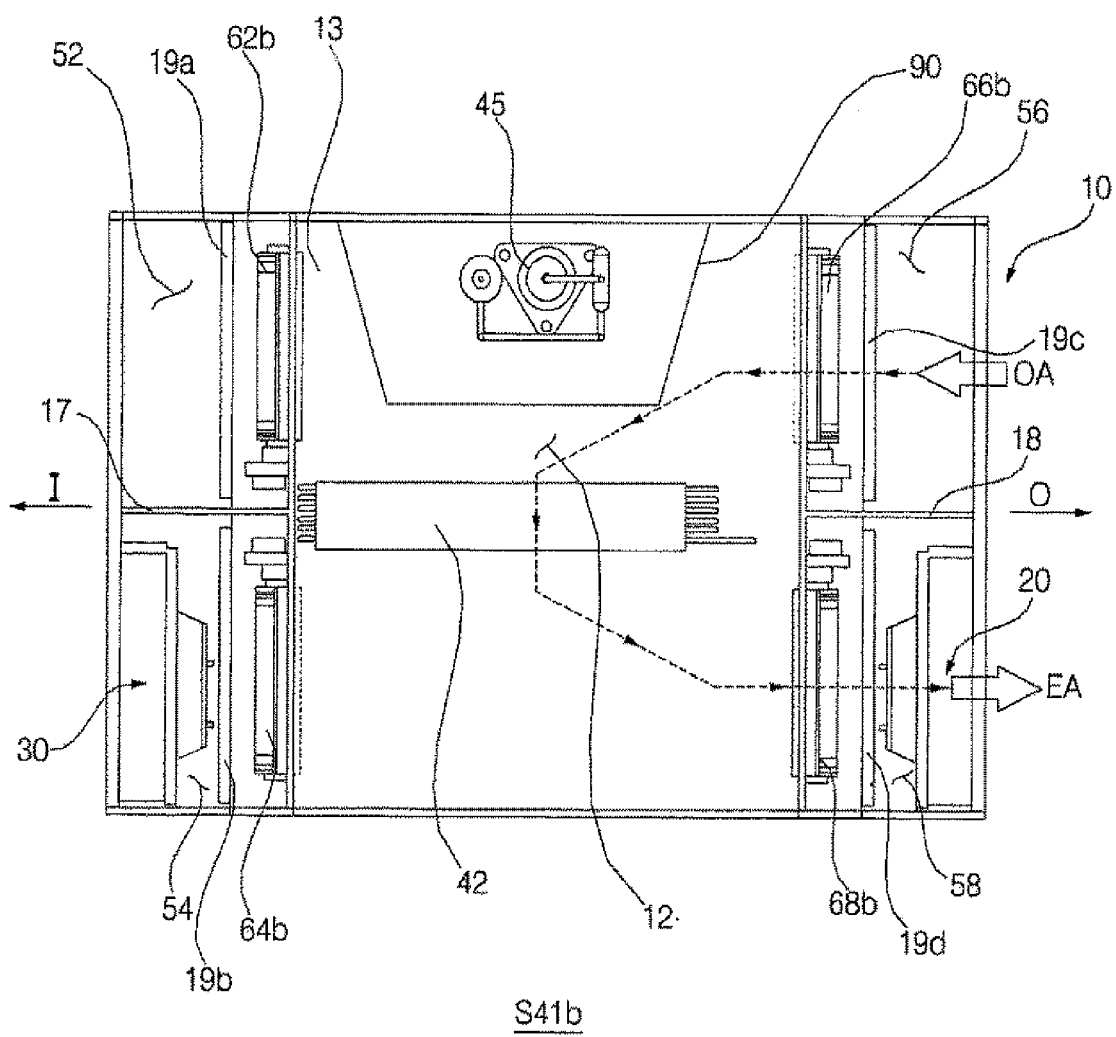

[Fig. 10a]
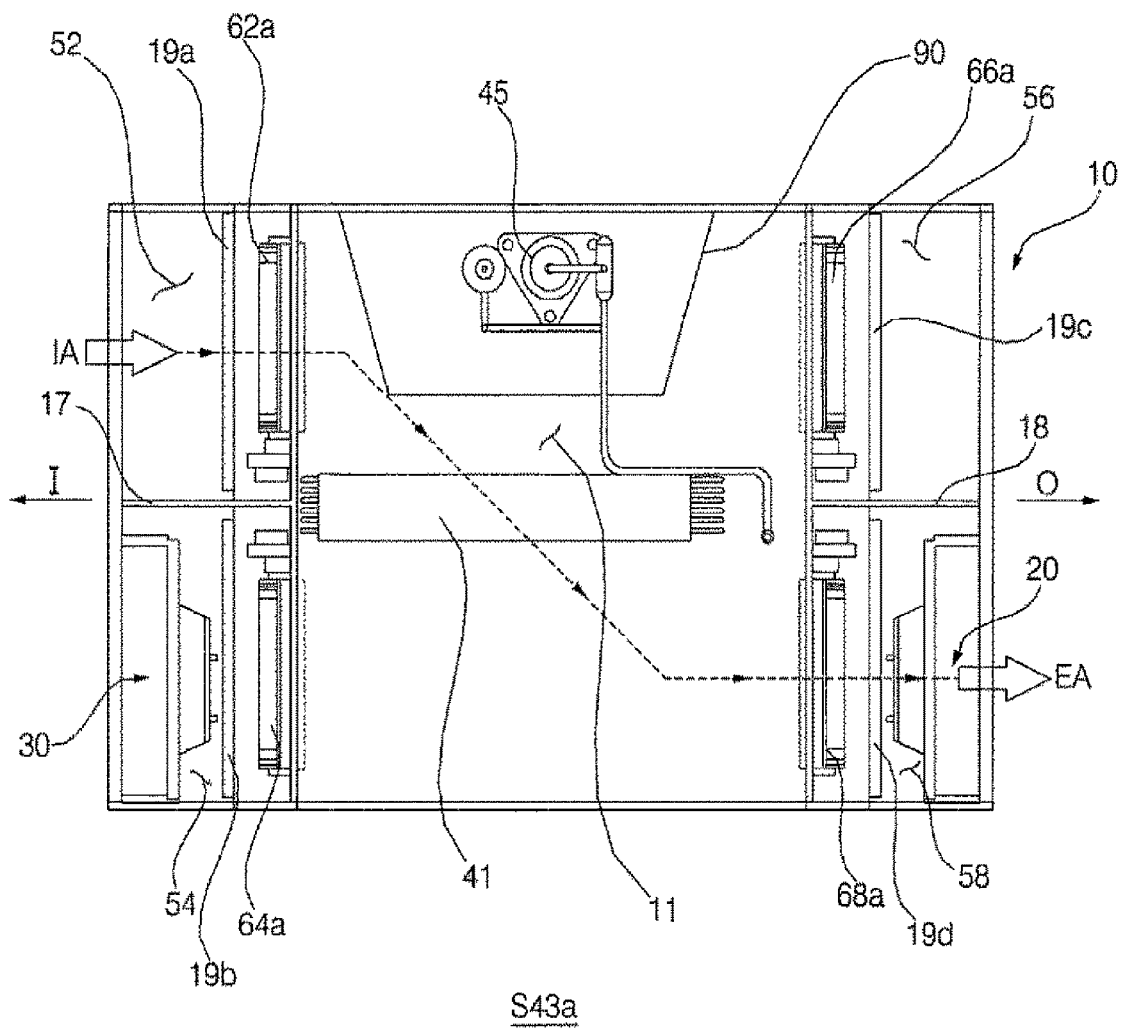
S43a

[Fig. 10b]
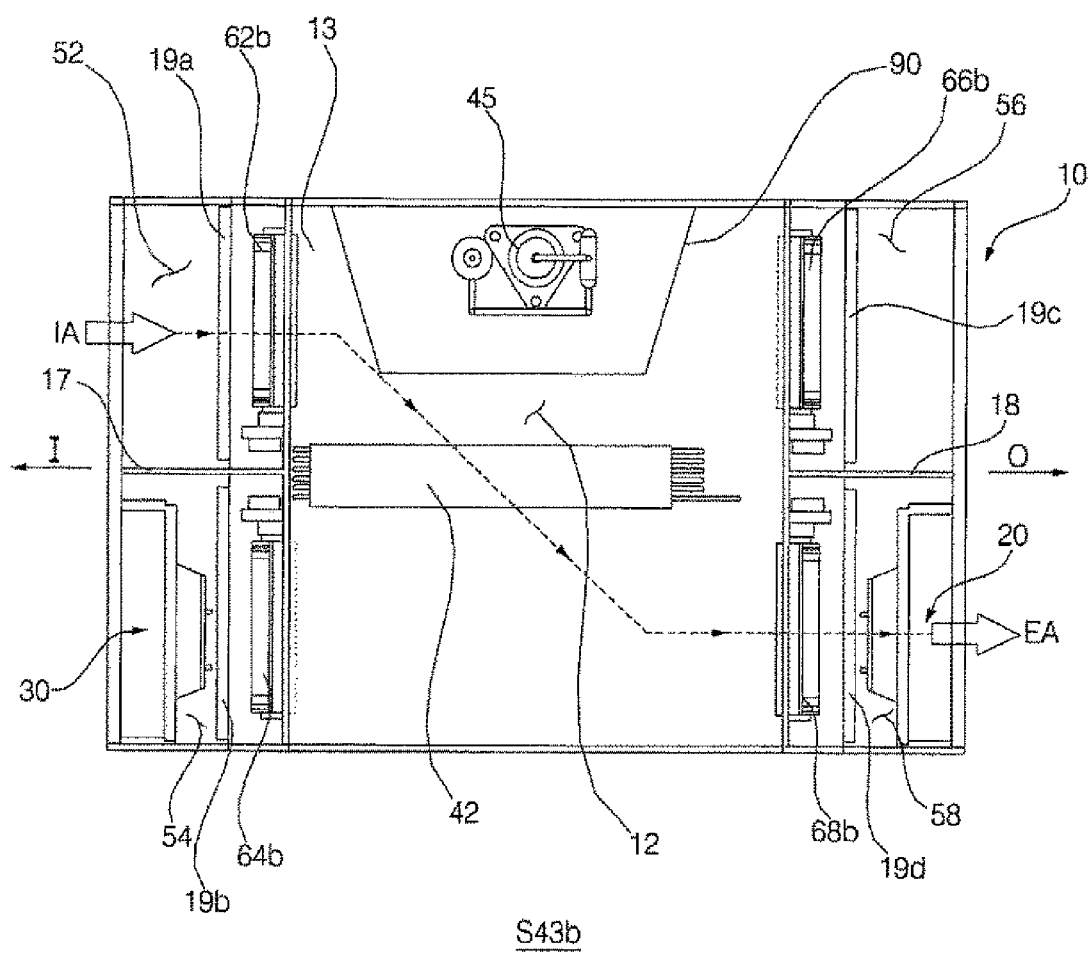
S43b

CONTROLLING DRYING CONDITIONS TO MAINTAIN HUMIDITY LEVELS DURING HVAC OPERATION

CROSS-REFERENCE TO RELATED PATENT APPLICATIONS

This application is a U.S. National Stage Application under 35 U.S.C. § 371 of PCT Application No. PCT/KR2018/008873, filed on Aug. 6, 2018, which claims priority to Korean Patent Application No. 10-2017-0099750, filed Aug. 7, 2017, whose entire disclosures are hereby incorporated by reference.

TECHNICAL FIELD

The present invention relates to an air conditioner having a heat exchange system and a control method thereof.

BACKGROUND ART

The air conditioner is an apparatus for adjusting the temperature of the air or adjusting the humidity of the air.

An air conditioner having an air exhaust function for discharging an indoor air (inside air) to the outside is known, and an air conditioner having an air supply function for introducing an outdoor air (outside air) into the room is known.

Further, an air conditioner having a heating operation function for heating the outside air and supplying the heated air to the room is known, and an air conditioner having a cooling operation function for cooling the outside air and supplying the cooled air to the room is known.

Further, an air conditioner having a dehumidification operation function for dehumidifying the outside air and supplying the dehumidified air to the room is known, and an air conditioner having a humidification operation function for humidifying the outside air and supplying the humidified air to the room is known. An air conditioning apparatus that performs a dehumidification operation or a humidification operation by using a desiccant method is known.

DISCLOSURE OF INVENTION

Technical Problem

During a dehumidification operation using a conventional desiccant method, there is a problem in the dehumidification function that dehumidification does not occur smoothly when the water adsorbed by a desiccant coating is saturated. A first object of the present invention is to solve such a problem.

During the dehumidification operation or the humidification operation using the conventional desiccant method, when the water adsorbed by the desiccant coating is saturated, there is a problem that condensation may occur in the air conditioner to cause a malfunction of the product or cause mold, and to generate odor when air is supplied to the indoor side. Particularly, in the air conditioner using the desiccant method, the evaporator function and the condenser function of two heat exchangers are periodically switched even during the humidification operation. Accordingly, since an evaporator disposed in a flow path that exhausts air during the humidification operation is changed to the condenser in the flow path that is supplied with air immediately, the condensation liquid water which is generated when the evaporator function is operated may cause a problem in the air immediately supplied. A second object of the present invention is to solve such a problem.

In order to solve the first and second objects, when the water level of the collected condensation water is detected by using a floating switch or the like, it may be detected only after considerable condensation water has already been generated, and there is a problem that the problem caused by the condensation water cannot be avoided for a considerable period of time. A third object of the present invention is to solve such a problem.

A fourth object of the present invention is to perform the process of removing condensation water more efficiently.

A fifth object of the present invention is to provide an air conditioner that functions in various modes according to users preference and various conditions of indoor/outdoor states.

Solution to Problem

In an aspect, there is provided an air conditioner, including: a heat exchange module comprising i) a compressor in which refrigerant circulates, a first heat exchanger, an expansion valve, and a second heat exchanger, and ii) an absorbent disposed in an outer surface of the first and second heat exchangers; at least one humidity sensor; and a controller which controls to stop a normal operation and perform a drying operation for supplying air to any one of the first and second heat exchangers served as an evaporator, when it is determined that a certain drying operation condition is satisfied based on humidity information of air passed through the any one served as the evaporator, during the normal operation in which the any one of the first and second heat exchangers serves as an evaporator and the other serves as a condenser.

The drying operation condition comprises a humidity condition which is previously set to be satisfied when a relative humidity of the air passed through the any one served as the evaporator exceeds a certain value.

The drying operation condition comprises a time condition in which a holding time of a state of satisfying the humidity condition exceeds a set time.

The controller controls to perform an outside air drying operation for supplying an outside air when an outside air temperature is higher than an inside air temperature, and controls to perform an inside air drying operation for supplying an inside air when the inside air temperature is higher than the outside air temperature.

The outside air supplied during the outside air drying operation is discharged to an outdoor side and the inside air supplied during the inside air drying operation is discharged to the outdoor side.

The controller controls the first and second heat exchangers to serve as a condenser and an evaporator alternately in the normal operation and controls to supply air to any one of the first and second heat exchangers which served as the evaporator at a time when the drying operation condition is satisfied in the drying operation.

The air conditioner further comprises: a first common flow path in which the first heat exchanger is disposed; a second common flow path in which the second heat exchanger is disposed; an outside air chamber into which an outside air flows into an inside; an air supply chamber through which a supplying air flows out to an indoor side from an inside; an inside air chamber into which an inside air flows into an inside; an exhaust air chamber through which an exhaust air flows out to an outdoor side from an inside; a first inside air damper which opens and closes a connection between the first common flow path and the inside air chamber; a first exhaust air damper which opens and closes a connection between the first common flow path and the exhaust air chamber; a first outside air damper which opens and closes a connection between the first common flow path and the outside air chamber; a first air supply damper which opens and closes a connection between the first common flow path and the air supply chamber; a second inside air damper which opens and closes a connection between the second common flow path and the inside air chamber; a second exhaust air damper which opens and closes a connection between the second common flow path and the exhaust air chamber; a second outside air damper which opens and closes a connection between the second common flow path and the outside air chamber; and a second air supply damper which opens and closes a connection between the second common flow path and the exhaust air chamber.

The controller, during the normal operation, controls to i) open the first inside air damper, the first exhaust air damper, the second outside air damper, and the second air supply damper, and close the second inside air damper, the second exhaust air damper, the first outside air damper, and the first air supply damper, or ii) close the first inside air damper, the first exhaust air damper, the second outside air damper, and the second air supply damper, and open the second inside air damper, the second exhaust air damper, the first outside air damper, and the first air supply damper and, during the drying operation, controls to i) close the first inside air damper and the first air supply damper and open the first outside air damper and the first exhaust air damper, ii) close the second inside air damper and the second air supply damper and open the second exhaust air damper and the second exhaust air damper, iii) close the first outside air damper and the first air supply damper and open the first inside air damper and the first exhaust air damper, or iv) close the second outside air damper and the second air supply damper and open the second inside air damper and the second exhaust air damper.

The air conditioner further comprises: an exhaust fan which is disposed in the exhaust chamber; and an air supply fan which is disposed in the air supply chamber, wherein the controller controls, during the normal operation, the exhaust fan and the air supply fan to operate, and controls, during the drying operation, the exhaust fan to operate and to stop the air supply fan.

The controller, when an outside air temperature is higher than an inside air temperature, during the drying operation, controls to i) close the first inside air damper and the first air supply damper and open the first outside air damper and the first exhaust air damper, or ii) close the second inside air damper and the second air supply damper and open the second outside air damper and the second exhaust air damper, and, when the inside air temperature is higher than the outside air temperature, during the drying operation, controls to i) close the first outside air damper and the first air supply damper and open the first inside air damper and the first exhaust air damper, or ii) close the second outside air damper and the second air supply damper and open the second inside air damper and the second exhaust air damper.

The controller, when the first heat exchanger served as an evaporator at a time when the drying operation condition is satisfied, during the drying operation, controls to i) close the first inside air damper and the first air supply damper and open the first outside air damper and the first exhaust air damper, or controls to ii) close the first outside air damper and the first air supply damper and open the first inside air damper and the first exhaust air damper, and, when the second heat exchanger served as an evaporator at the time when the drying operation condition is satisfied, during the drying operation, controls to i) close the second inside air damper and the second air supply damper and open the second outside air damper and the second exhaust air damper, or controls to ii) close the second outside air damper and the second air supply damper and open the second inside air damper and the second exhaust air damper.

The controller, i) when the first heat exchanger served as an evaporator at a time when the drying operation condition is satisfied, when an outside air temperature is higher than an inside air temperature, during the drying operation, controls to close the first inside air damper and the first air supply damper and open the first outside air damper and the first exhaust air damper, ii) when the second heat exchanger served as an evaporator at the time when the drying operation condition is satisfied, when the outside air temperature is higher than the inside air temperature, during the drying operation, controls to close the second inside air damper and the second air supply damper and open the second outside air damper and the second exhaust air damper, iii) when the first heat exchanger served as an evaporator at the time when the drying operation condition is satisfied, when the inside air temperature is higher than the outside air temperature, during the drying operation, controls to close the first outside air damper and the first air supply damper and open the first inside air damper and the first exhaust air damper, and iv) when the second heat exchanger served as an evaporator at the time when the drying operation condition is satisfied, when the inside air temperature is higher than the outside air temperature, during the drying operation, controls to close the second outside air damper and the second air supply damper and open the second inside air damper and the second exhaust air damper.

The at least one humidity sensor comprises: an exhaust air humidity sensor that detects a humidity of an exhaust air discharged to an outdoor side through the heat exchange module; and an air supply humidity sensor that detects a humidity of a supplying air supplied to an indoor side through the heat exchange module, wherein the controller determines whether the drying operation condition is satisfied based on humidity information of the exhaust air humidity sensor and the air supply humidity sensor.

In another aspect, there is provided a method of controlling an air conditioner comprising i) a compressor in which refrigerant circulates, a first heat exchanger, an expansion valve, and a second heat exchanger, and ii) an absorbent disposed in an outer surface of the first and second heat exchangers, the method comprising a step (a), during a normal operation in which any one of the first and second heat exchangers serves as an evaporator and the other serves as a condenser, of detecting humidity information of an air passed through any one serves as an evaporator, and determining whether a certain drying operation condition is satisfied based on the detected humidity information; and a step (b) of stopping the normal operation when the drying operation condition is satisfied and performing a drying operation for supplying air to the any one served as an evaporator.

The normal operation is maintained when the drying operation condition is not satisfied.

In the step (b), when an outside air temperature is higher than an inside air temperature, an outside air drying operation for supplying an outside air is performed, and when the inside air temperature is higher than the outside air temperature, an inside air drying operation for supplying an inside air is performed.

In the step (b), when the first heat exchanger served as an evaporator at a time when the drying operation condition is satisfied, a first drying operation for supplying air to the first heat exchanger is performed, and when the second heat exchanger served as an evaporator at the time when the drying operation condition is satisfied, a second drying operation for supplying air to the second heat exchanger is performed.

In the step (b), i) when the first heat exchanger served as an evaporator at a time when the drying operation condition is satisfied, if an outside air temperature is higher than an inside air temperature, a first outside air drying operation for supplying air to the first heat exchanger is performed, ii) when the second heat exchanger served as an evaporator at the time when the drying operation condition is satisfied, if the outside air temperature is higher than the inside air temperature, a second outside air drying operation for supplying air to the second heat exchanger is performed, iii) when the first heat exchanger served as an evaporator at the time when the drying operation condition is satisfied, if the inside air temperature is higher than the outside air temperature, a first inside air drying operation for supplying air to the first heat exchanger is performed, and iv) when the second heat exchanger served as an evaporator at the time when the drying operation condition is satisfied, if the inside air temperature is higher than the outside air temperature, a second inside air drying operation for supplying air to the second heat exchanger is performed.

Advantageous Effects of Invention

The air conditioning apparatus that performs a dehumidifying function smoothly may be implemented through the drying operation using the drying operation condition.

In addition, through the drying operation using the drying operation condition, the occurrence of condensation water in the air conditioner using the absorbent is minimized, thereby preventing the occurrence of malfunctions and mold of the product, and the occurrence of odors.

In addition, through the determination of the drying operation condition based on the humidity information, it is possible to estimate the generation of condensation water in a relatively short period of time and to induce earlier progress of the drying operation.

In addition, through the time condition, it is possible to reduce the probability of the drying operation which is unnecessarily performed as the water condition is temporarily satisfied even though no condensation water is generated in the apparatus.

In addition, due to the comparison of the outside air temperature and the inside air temperature and a corresponding drying operation using the outside air or inside air, the condensation water can be removed in a shorter time during the drying operation.

In addition, by discharging the air to the outdoor side during the drying operation, the condensation water can be discharged to the outdoor side, so that a more pleasant indoor environment can be created.

Further, in the air conditioner, provided with an absorbent, having a switching system, by supplying air to any one of the first and second heat exchangers served as an evaporator during the drying operation, more efficient drying operation can be achieved.

In addition, the most suitable and efficient drying operation can be performed according to various indoor/outdoor state conditions and the state of the apparatus, through various drying operation methods performed depending on the situation.

Further, through the common flow paths, the chambers, and the dampers, various modes of operation can be performed by using a minimum configuration, and in particular, a plurality of drying operation modes may be implemented by using a minimum configuration.

BRIEF DESCRIPTION OF DRAWINGS

FIG. 1 is a perspective view showing a part of an air conditioner according to an embodiment of the present invention.

FIG. 2 is a sectional view of a first layer of the air conditioner of FIG. 1 cut along a line S1-S1' in a X-axis direction.

FIG. 3 is a sectional view of a second layer of the air conditioner of FIG. 1 cut along a line S2-S2' in a X-axis direction.

FIG. 4A and FIG. 4B are conceptual diagrams of a refrigerant flow and an air flow of the air conditioner of FIG. 1. FIG. 4A shows an air flow in a first flow path mode and shows a refrigerant flow in a second heat exchange mode, and FIG. 4B shows an air flow in a second flow path mode and shows a refrigerant flow in a first heat exchange mode.

FIG. 6A and FIG. 6B are a psychometric chart and a conceptual diagram showing the change of air state due to water adsorption of a heat exchanger 41 or 42 serving as an evaporator.

FIG. 6A shows an example of the change of air state, when an absorbent Ab of the evaporator 41 or 42 adsorbs water W before being saturated. FIG. 6B shows an example of the change of air state, when condensation water W' is generated in addition to the adsorbed water W as the absorbent Ab of the evaporator 41 or 42 is saturated.

FIG. 9A to FIG. 10B are views showing a flow of air in a drying operation mode of the air conditioner of FIG. 1, FIG. 9A and FIG. 10A show a flow of air on the sectional view of FIG. 2, and FIG. 9B and FIG. 10B show a flow of air on the sectional view of FIG. 3. FIG. 9A and FIG. 9B show a flow of air in an outside air drying operation mode, and FIG. 10A and FIG. 10B show a flow of air in an inside air drying operation mode.

BEST MODE FOR CARRYING OUT THE INVENTION

Figure 5:
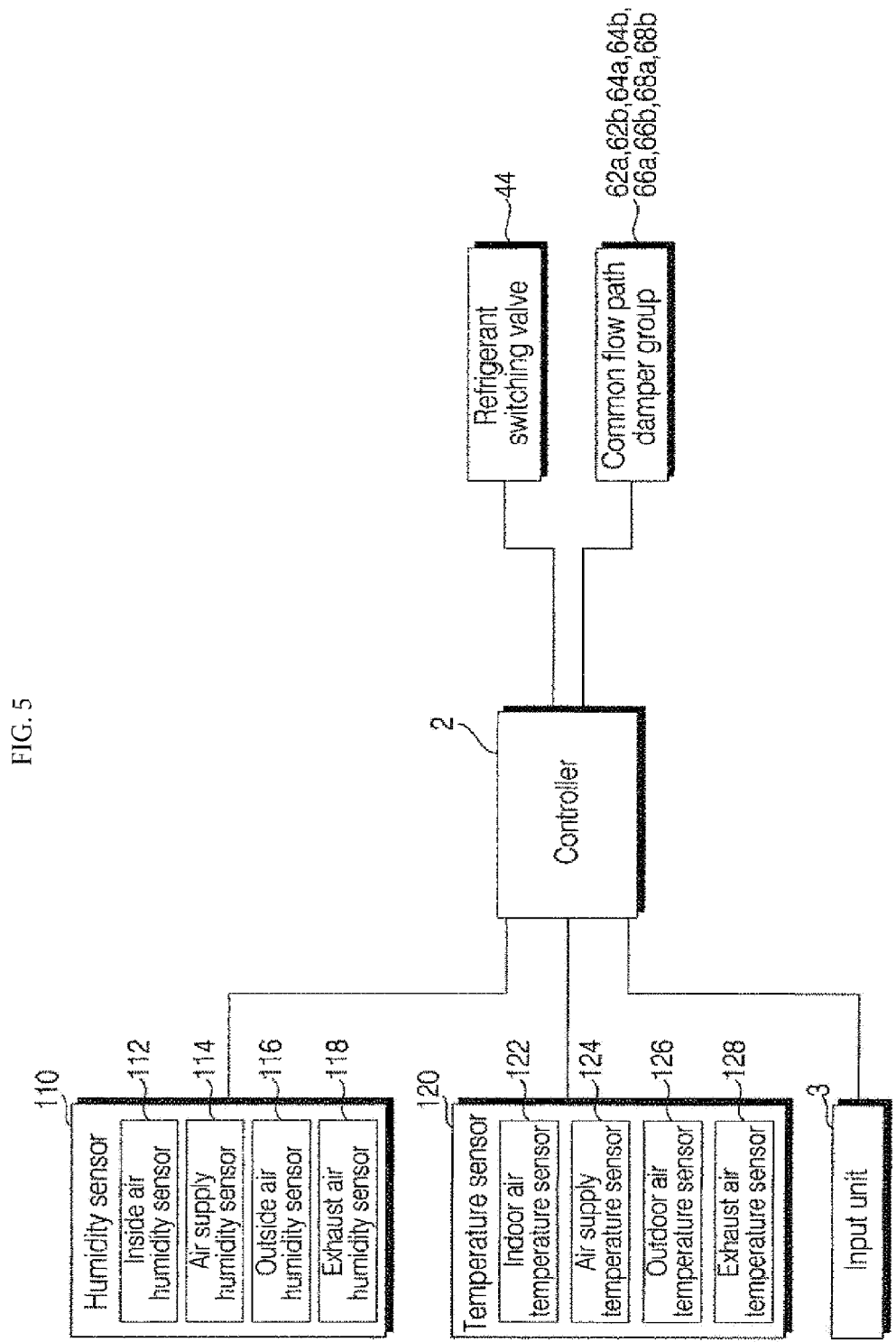
FIG. 5 is a control block diagram of the air conditioner of FIG. 1.

Arrows O and I denoted in the drawings indicate the outdoor side O and the indoor side I, respectively. The outdoor side O and the indoor side I are used to explain the relationship between the air sucked or discharged by an air conditioner according to the present invention and the surrounding environment. In the drawing, as an example, it is shown that the outdoor side I and the indoor side I are in the opposite direction, but both sides may not be in the opposite direction.

Referring to FIG. 1, the X axis direction includes the +X axis direction and the −X axis direction, and the Y axis direction includes the +Y axis direction and the −Y axis direction. In this drawing, the Y-axis direction and the X-axis direction are referred to as a vertical direction and a left-right direction respectively. However, this is only for the purpose of clarifying the present invention, and it is obvious that the directions may be defined differently depending on where the reference is placed.

In addition, 'upstream' and 'downstream' mentioned in this description are defined based on the flow direction of the fluid on a corresponding flow path.

The preceding term "first, second, third" and the like among the term of components mentioned below is intended to avoid confusion of the referred components, and is irrelevant to the order, importance, or master-servant relationship among the components. For example, the invention including only a second component without a first component may be implemented.

In the large and small comparison of linguistic/mathematical expressions throughout this description, the terms "smaller than or equal to (less than or equal to)" and "less than (below)" are easily replaceable from the standpoint of a person skilled in the art, and the terms "greater than or equal to (more than or equal to)" and "greater than (above)" are easily replaceable from the standpoint of a person skilled in the art. It is obvious that the present invention does not pose a problem when the above mentioned terms are replaced.

The air conditioner according to an embodiment of the present invention includes a case 10 forming an external shape. The air conditioner includes a supplying air flow path OA-SA for guiding an outside air OA to move to the indoor side I. The air conditioner includes an exhaust air flow path IA-EA for guiding an inside air IA to move to the outdoor side O. The air conditioner includes a fan module 20, 30 that pressurizes air to move. The air conditioner includes a heat exchange module 40 provided to change the moisture content in the air.

Referring to FIG. 4A and FIG. 4B, the supplying air flow path OA-SA means a flow path having a path from a point to which the outside air OA is introduced to a point from which the introduced outside air OA is discharged as a supplying air SA. The exhaust air flow path IA-EA means a flow path having a path from a point to which the inside air IA is introduced to a point from which the introduced inside air IA is discharged as an exhaust air EA. The supplying air flow path OA-SA and the exhaust air flow path IA-EA are provided changeably by dampers described later. The outside air OA flows through the supplying air flow path OA-SA to become the supplying air SA and the inside air IA flows through the exhaust air flow path IA-EA to become the exhaust air EA.

Further, the air conditioner may be provided such that the supplying air flow path OA-SA is closed in a drying operation mode described later. Particularly, the air conditioner may be provided so that both the supplying air flow path OA-SA and the exhaust air flow path IA-EA are closed in an outside air drying operation mode described later. Referring to FIG. 9A and FIG. 9B, in the air conditioner, the supplying air flow path OA-SA and the exhaust air flow path IA-EA are closed and an outside air drying flow path OA-EA is opened in the outside air drying operation mode described later. Referring to FIG. 10A and FIG. 10B, in the air conditioner, the supplying air flow path OA-SA is closed and the exhaust air flow path IA-EA served as an inside air drying flow path IA-EA in an inside air drying operation mode described later. The supplying air flow path OA-SA, the exhaust air flow path IA-EA, and the drying flow path are provided to be opened and closed by dampers described later.

Referring to FIG. 1 to FIG. 3, the case 10 forms the appearance of the air conditioner. The supplying air flow path OA-SA and the exhaust air flow path IA-EA are formed inside the case 10. The fan module 20, 30 is disposed inside the case 10. The heat exchange module 40 is disposed inside the case 10. Chambers and dampers, which will be described later, are disposed inside the case 10.

The fan module 20, 30 includes an exhaust fan 20 that applies pressure to air so that the air is discharged to the outdoor side. The exhaust fan 20 may be disposed in an exhaust air chamber 58.

The fan module 20, 30 includes an air supply fan 30 which applies pressure to the air to discharge air to the indoor side. The air supply fan 30 may be disposed in an air supply chamber 54.

The air conditioner may include a filter 19 for filtering foreign substances in the air flow path. The filter 19$b$, 19$c$ filters out foreign substances in the supplying air flow path OA-SA. The filter 19$a$, 19$d$ filters out foreign substances in the exhaust air flow path IA-EA. The filter 19$c$, 19$d$ filters out foreign substances in the outside air drying flow path OA-EA. The filter 19$a$, 19$d$ filters out foreign substances in the inside air drying flow path IA-EA.

The filter 19$a$ may be disposed in an inside air chamber 52. The filter 19$d$ may be disposed in the exhaust air chamber 58. The filter 19$c$ may be disposed in an outside air chamber 56. The filter 19$b$ may be disposed in the air supply chamber 54.

Referring to FIG. 4A to FIG. 10, the heat exchange module 40 includes a first heat exchanger 41, a second heat exchanger 42, an expansion valve 43, and a compressor 45 through which the refrigerant circulates. The heat exchange module 40 includes a refrigerant pipe (not shown) connecting the first heat exchanger 41, the second heat exchanger 42, the expansion valve 43, and the compressor 45.

In a normal operation mode, one of the first heat exchanger 41 and the second heat exchanger 42 served as an evaporator and the other served as a condenser. When the refrigerant sequentially flows through the compressor 45, the first heat exchanger 41, the expansion valve 43, and the second heat exchanger 42 to form a refrigerant cycle, the first heat exchanger 41 serves as the condenser and the second heat exchanger 42 serves as the evaporator. When the refrigerant sequentially flows through the compressor 45, the second heat exchanger 42, the expansion valve 43 and the first heat exchanger 41 to form a refrigerant cycle, the second heat exchanger 42 serves as the condenser and the first heat exchanger 41 serves as the evaporator.

The heat exchange module 40 may further include a refrigerant switching valve 44 for switching the function of the evaporator and the function of the condenser performed by the first heat exchanger 41 and the second heat exchanger 42. The refrigerant cycle may be switched by the refrigerant switching valve 44 and the functions of the evaporator and the condenser of the first heat exchanger 41 and the second heat exchanger 42 may be switched to each other.

The refrigerant flowed through the compressor 45 may be introduced into the first heat exchanger 41 side or the second heat exchanger 42 side by the refrigerant switching valve 44. The refrigerant sequentially flows through the compressor 45 and the refrigerant switching valve 44 and then moves firstly to any one of the first heat exchanger 41 and the second heat exchanger 42 selected by the refrigerant switching valve 44, flows through the expansion valve 43, and moves to the other of the first heat exchanger 41 and the second heat exchanger 42. The refrigerant flowed through all of the first heat exchanger 41, the expansion valve 43, and the second heat exchanger 42 may be recovered to the compressor 45 through an accumulator (not shown).

The first heat exchanger 41 is disposed in a first common flow path 11. The second heat exchanger 42 is disposed in a second common flow path 12.

The first heat exchanger 41 is disposed in one of the supplying air flow path OA-SA and the exhaust air flow path IA-EA, and the second heat exchanger 42 is disposed in the other.

Referring to FIG. 4A, in a first flow path mode in which the first common flow path 11 constitutes a part of the exhaust air flow path IA-EA and the second common flow path 12 constitutes a part of the supplying air flow path OA-SA, the first heat exchanger 41 is disposed in the exhaust air flow path IA-EA and the second heat exchanger 42 is disposed in the supplying air flow path OA-SA.

Referring to FIG. 4B, in a second flow path mode in which the first common flow path 11 constitutes a part of the supplying air flow path OA-SA and the second common flow path 12 constitutes a part of the exhaust air flow path IA-EA, the second heat exchanger 42 is disposed in the exhaust air flow path IA-EA and the first heat exchanger 41 is disposed in the supplying air flow path OA-SA.

FIG. 5 to FIG. 10 are illustratively shown based on the first flow path mode.

For example, even when the functions of the first and second heat exchangers 41 and 42 are not switched to each other by the refrigerant switching valve 44, one mode of the first flow path mode (see FIG. 4A) and the second flow path mode (see FIG. 4B) may be changed to the other mode, so that one mode of the humidification operation mode and the dehumidification operation mode may be changed to the other mode.

For example, in a state in which one of the humidification operation mode and the dehumidification operation mode is maintained, the functions of the first and second heat exchangers 41 and 42 may be switched (refrigerant switched) by the refrigerant switching valve 44 while simultaneously switching (flow path switching) one mode of the first flow path mode and the second flow path mode to the other mode, so that the first and second heat exchangers 41 and 42 perform an evaporator function and a condenser function alternately.

The heat exchange module 40 may perform a dehumidification function. The heat exchanging module 40 may dehumidify the supplying air SA and dehumidify the exhaust air EA. The dehumidification operation means the operation of dehumidifying the supplying air SA. During the dehumidification operation, the humidification of the exhaust air EA may performed simultaneously. The heat exchange module 40 may adsorb and dehumidify the water in the air. The heat exchange module 40 may adsorb the water in the air to be discharged to the indoor side I so that the dehumidified air may be discharged to the indoor side I. At this time, the heat exchange module 40 supplies water to the air to be discharged to the outdoor side O, and allows the humidified air to be discharged to the outdoor side O.

The heat exchange module 40 may perform a humidification function. The heat exchanger module 40 may humidify the supplying air SA and humidify the exhaust air EA. The humidification operation means the operation of humidifying the supplying air SA. During the humidification operation, the dehumidification of the exhaust air EA may be performed simultaneously. The heat exchange module 40 may desorb the adsorbed and stored water into the air to humidify. The heat exchange module 40 may supply water to the air to be discharged to the indoor side I so that the humidified air may be discharged to the indoor side I. At this time, the heat exchange module 40 may adsorb water in the air to be discharged to the outdoor side O so that the dehumidified air may be discharged to the outdoor side O.

The heat exchange module 40 may selectively perform any one of the dehumidification operation and the humidification operation in the normal operation mode.

The heat exchange module 40 includes an absorbent Ab provided to adsorb water in the air. The absorbent Ab is disposed on the outer surfaces of the first and second heat exchangers 41 and 42. The absorbent Ab is provided to adsorb water in the air at a relatively low temperature and to desorb water into the air at a relatively high temperature.

As an example of the absorbent Ab, a desiccant coating may be provided on the surfaces of the first and second heat exchangers 41 and 42. The desiccant coating is a material capable of absorbing water in the air and releasing the absorbed water into the air when heat is applied, and since it is a material commonly used by those skilled in the art, a detailed description thereof will be omitted.

In the present embodiment, the first and second heat exchangers 41 and 42 may serve alternately as a condenser or an evaporator according to cycle switching. The absorbent Ab disposed in the outdoor side Of any one of the heat exchangers (41 or 42) absorbs water when any one of the heat exchangers (41 or 42) served as an evaporator, and releases the water already absorbed into the air when any one of the heat exchangers (41 or 42) served as a condenser.

As the absorbent Ab adsorbs water, the degree of water saturation is increased. The first and second heat exchangers 41 and 42 serve as a condenser or an evaporator alternately according to the switching cycle, so that the above-mentioned dehumidification operation or humidification operation can be performed continuously.

Referring to FIG. 1 to FIG. 3, the air conditioner includes the first common flow path 11 in which the first heat exchanger 41 is disposed, the second common flow path 12 in which the second heat exchanger 42 is disposed. The first common flow path 11 and the second common flow path 12 form a different flow path respectively. The first common flow path 11 and the second common flow path 12 may be disposed to be stacked. For example, the second common flow path 12 is stacked on the upper side of the first common flow path 11. The first common flow path 11 and the second common flow path 12 are disposed inside the case 10.

The first common flow path 11 and the second common flow path 12 are partitioned into a first layer and a second layer by a common flow path separation plate 13. In this embodiment, the first common flow path 11 is disposed in the lower side of the common flow path separation plate 13 and the second common flow path 12 is disposed in the upper side of the common flow path separation plate 13. However, the present invention is not limited thereto, and the second common flow path 12 may be disposed in the lower side and the first common flow path 11 may be disposed in the upper side. Further, the first common flow path 11 and the second common flow path 12 may be disposed in the left-right direction.

Referring to FIG. 1 to FIG. 10, the air conditioner includes a plurality of chambers 52, 54, 56, and 58 disposed in both end sides (upstream side and downstream side) of the first and second common flow paths 11 and 12. The plurality of chambers 52, 54, 56, and 58 are disposed to be able to be connected to the first common flow path 11 and the second common flow path 12, respectively. The plurality of chambers 52, 54, 56, and 58 respectively form a space which is connected across the common flow path separation plate 13. In the present embodiment, the plurality of chambers 52, 54, 56, and 58 respectively form a space which is connected and vertically crosses the common flow path separation plate 13. Accordingly, the plurality of chambers 52, 54, 56 and 58 are respectively disposed to be able to be connected to the first common flow path 11 in the lower side of the common flow path separation plate 13 and the second common flow path 12 in the upper side of the common flow path separation plate 13. The connection of the plurality of chambers 52, 54, 56, 58 with the first common flow path 11 and the second common flow path 12 is changed by a common flow path damper group 62a, 62b, 64a, 64b, 66a, 66b, 68a, 68b described later.

The outside air chamber 56 sucks the outside air OA from the outdoor side O. The outside air OA flows into the inside of the outside air chamber 56 from the outdoor side O. The outside air chamber 56 constitutes at least a part of the upstream portion of the supplying air flow path OA-SA. The outside air chamber 56 constitutes at least a part of the upstream portion of the outside air drying flow path OA-EA.

The air supply chamber 54 discharges supplying air SA to the indoor side I. The supplying air SA flows out from the inside of the air supply chamber 54 to the indoor side. The air supply chamber 54 constitutes at least a part of the downstream portion of the supplying air flow path.

The inside air chamber 52 sucks the inside air IA from the indoor side I. The inside air IA flows into the inside of the inside air chamber 52. The inside air chamber 52 constitutes at least a part of the upstream portion of the exhaust air flow path IA-EA. The inside air chamber 52 constitutes at least part of the upstream portion of the inside air drying flow path IA-EA.

The exhaust air chamber 58 discharges the exhaust air EA to the outdoor side O. The exhaust air EA flows out from the inside of the exhaust air chamber 58 to the outdoor side O. The exhaust air chamber 58 constitutes at least a part of the downstream portion of the exhaust air flow path IA-EA. The exhaust air chamber 58 constitutes at least a part of the downstream portion of the drying flow path. The exhaust air chamber 58 constitutes at least a part of the downstream portion of the outside air drying flow path OA-EA and the inside air drying flow path IA-EA.

The first common flow path 11 and the second common flow path 12 are disposed between the outside air chamber 56 and the air supply chamber 54. The first common flow path 11 and the second common flow path 12 are disposed between the inside air chamber 52 and the exhaust air chamber 58.

Referring to FIG. 4A, in the first flow path mode, the outside air OA flows into the outside air chamber 56 and then flows through the second common flow path 12 and the air supply chamber 54 sequentially, and is supplied to the indoor side I. In the first flow path mode, the inside air IA flows into the inside air chamber 52 and then flows through the first common flow path 11 and the exhaust air chamber 58 sequentially, and is discharged to the outdoor side O.

Referring to FIG. 4B, in the second flow path mode, the outside air OA flows into the outside air chamber 56 and then flows through the first common flow path 11 and the air supply chamber 54 sequentially, and is supplied to the indoor side I. In the second flow path mode, the inside air IA flows into the inside air chamber 52 and then flows through the second common flow path 12 and the exhaust air chamber 58 sequentially, and is discharged to the outdoor side O.

Referring to FIG. 9A and FIG. 9B, the outside air drying flow path OA-EA means a flow path which sequentially connects i) the outside air chamber 56, ii) the first common flow path 11 and/or the second common flow path 12, and (iii) the exhaust air chamber 58.

Referring to FIG. 10A and FIG. 10B, the inside air drying flow path IA-EA means a flow path which sequentially connects i) the inside air chamber 52, ii) the first common flow path 11 and/or the second common flow path 12, and (iii) the exhaust air chamber 58.

Referring to FIGS. 9A and 10A, a first drying flow path means a flow path which sequentially connects i) the outside air chamber 56 and/or the inside air chamber 52, ii) the first common flow path 11, and (iii) the exhaust air chamber 58.

Referring to FIGS. 9B and 10B, a second drying flow path means a flow path which sequentially connects i) the outside air chamber 56 and/or the inside air chamber 52, ii) the second common flow path 12, and (iii) the exhaust air chamber 58.

Referring to FIG. 9A, in a first outside air drying flow path mode, the outside air OA flows into the outside air chamber 56, and then flows through the first common flow path 11 and the exhaust air chamber 58 sequentially, and is discharged to the outdoor side O. A first outside air drying flow path means a flow path which sequentially connects the outside air chamber 56, the first common flow path 11, and the exhaust air chamber 58.

Referring to FIG. 9B, in a second outside air drying flow path mode, the outside air OA flows into the outside air chamber 56, and then flows through the second common flow path 12 and the exhaust air chamber 58 sequentially, and is discharged to the outdoor side O. A second outside air drying flow path means a flow path which sequentially connects the outside air chamber 56, the second common flow path 12, and the exhaust air chamber 58.

Referring to FIG. 10A, in a first inside air drying flow path mode, the inside air IA flows into the inside air chamber 52, and then flows through the first common flow path 11 and the exhaust air chamber 58 sequentially, and is discharged to the outdoor side O. A first inside air drying flow path means a flow path which sequentially connects the inside air chamber 52, the first common flow path 11, and the exhaust air chamber 58.

Referring to FIG. 10B, in a second inside air drying flow path mode, the inside air IA flows into the inside air chamber 56, and then flows through the second common flow path 12 and the exhaust air chamber 58 sequentially, and is discharged to the outdoor side O. A second inside air drying flow path means a flow path which sequentially connects the inside air chamber 56, the second common flow path 12, and the exhaust air chamber 58.

The drying flow path includes the outside air drying flow path, the inside air drying flow path, the first drying flow path, the second drying flow path, the first outside air drying flow path, the second outside air drying flow path, the first inside air drying flow path, and the second inside air drying flow path.

The inside air chamber 52 and the air supply chamber 54 may be disposed in the indoor side I based on the first and second common flow paths 11 and 12. The inside air chamber 52 and the air supply chamber 54 may be divided into right and left (X-axis direction) by an indoor side chamber separation plate 17. The indoor side chamber separation plate 17 may extend in a direction of crossing the common flow path separation plate 13. The arrangement direction (X-axis direction) of two spaces separated by the indoor side chamber separation plate 17 and the arrangement direction (Y-axis direction) of two spaces separated by the common flow path separation plate 13 are perpendicular to each other.

The outside air chamber 52 and the exhaust air chamber 58 may be disposed in the outdoor side O based on the first and second common flow paths 11 and 12. The outside air chamber 56 and the exhaust air chamber 58 may be divided into right and left (X-axis direction) by an outdoor side chamber separation plate 18. The outdoor side chamber separation plate 18 may extend in a direction of crossing the common flow path separation plate 13. The arrangement direction (X-axis direction) of two spaces separated by the outdoor side chamber separation plate 18 and the arrangement direction (Y-axis direction) of two spaces separated by the common flow path separation plate 13 are perpendicular to each other.

Referring to FIG. 1 to FIG. 4B, the air conditioner includes a common flow path damper group 62a, 62b, 64a, 64b, 66a, 66b, 68a, 68b for adjusting a flow path connection between the first common flow path 11 or the second common flow path 12 and the plurality of chambers 52, 54, 56, 58. The common flow path damper group 62a, 62b, 64a, 64b, 66a, 66b, 68a, 68b is disposed in the end of the first common flow path 11 or in the end of the second common flow path 12.

A first inside air damper 62a opens and closes the connection between the first common flow path 11 and the inside air chamber 52.

A first exhaust air damper 68a opens and closes the connection between the first common flow path 11 and the exhaust air chamber 58.

A first outside air damper 66a opens and closes the connection between the first common flow path 11 and the outside air chamber 56.

A first air supply damper 64a opens and closes the connection between the first common flow path 11 and the air supply chamber 54.

A second inside air damper 62b opens and closes the connection between the second common flow path 12 and the inside air chamber 52.

A second exhaust air damper 68b opens and closes the connection between the second common flow path 12 and the exhaust air chamber 58.

A second outside air damper 66b opens and closes the connection between the second common flow path 12 and the outside air chamber 56.

A second air supply damper 64b opens and closes the connection between the second common flow path 12 and the exhaust air chamber 58.

The first inside air damper 62a and the first exhaust air damper 68a are disposed in both ends of the first common flow path 11, respectively.

The first outside air damper 66a and the first air supply damper 64a are disposed in both ends of the first common flow path 11, respectively.

The second inside air damper 62b and the second exhaust air damper 68b are disposed in both ends of the second common flow path 12, respectively.

The second outside air damper 66b and the second air supply damper 64b are disposed in both ends of the second common flow path 12, respectively.

Referring to FIG. 5, the air conditioner may include an input unit 3 for receiving an instruction from a user. The air conditioner may include a sensor unit 110, 120 that detects the state of the air.

The air conditioner may include a controller 2 for controlling the operation of the air conditioner based on detection information of the sensor unit 110, 120 and/or input information of the input unit 3.

The controller 2 may control the operation of the heat exchange module 40. The controller 2 may control the operation of the compressor 45. The controller 2 may control the switching operation of the refrigerant switching valve 44. The controller 2 may control the opening and closing of the common flow path damper group 62a, 62b, 64a, 64b, 66a, 66b, 68a, 68b.

The air conditioner includes at least one humidity sensor 110 that detects the humidity of the air. The humidity sensor 110 may detect humidity information of the air processed by the air conditioner. The humidity sensor 110 may detect the absolute humidity Ha or relative humidity Hr of the air. For example, the humidity sensor 110 may directly detect the relative humidity Hr of the air, and may detect the relative humidity Hr by measuring the absolute humidity Ha and the temperature of the air.

The at least one humidity sensor 110 may include an inside air humidity sensor (not shown) that detects the air humidity of the indoor side I. The at least one humidity sensor 110 may include an outdoor humidity sensor (not shown) that detects the air humidity of the outdoor side O.

Referring to FIG. 4A to FIG. 5, the at least one humidity sensor 110 may include an inside air humidity sensor 112 that detects the humidity of the inside air IA sucked from the indoor side I. The inside air humidity sensor 112 may detect the humidity of the inside air IA in the upstream point on the exhaust air flow path IA-EA in comparison with the heat exchange module 40. The inside air humidity sensor 112 may be disposed in the inside air chamber 52.

Referring to FIG. 4A to FIG. 5, the at least one humidity sensor 110 may include an air supply humidity sensor 114 that detects the humidity of the supplying air SA which is supplied to the indoor side I via the heat exchange module 40. The air supply humidity sensor 114 may detect the humidity of the supplying air SA in the downstream point on the supplying air flow path OA-SA in comparison with the heat exchange module 40. The air supply humidity sensor 114 may be disposed in the air supply chamber 54.

Referring to FIG. 4A to FIG. 5, the at least one humidity sensor 110 may include an outside air humidity sensor 116 that detects the humidity of the outside air OA that is sucked from the outdoor side O. The outside air humidity sensor 116 may detect the humidity of the outside air OA in the upstream point on the supplying air flow path OA-SA in comparison with the heat exchange module 40. The outside air humidity sensor 116 may be disposed in the outside air chamber 56.

Referring to FIG. 4A to FIG. 5, the at least one humidity sensor 110 may include an exhaust air humidity sensor 118 that detects the humidity of the exhaust air EA discharged to the outdoor side O through the heat exchange module 40. The exhaust air humidity sensor 118 may detect the humidity of the exhaust air EA in the downstream point on the exhaust air flow path IA-EA in comparison with the heat exchange module 40.

The at least one humidity sensor 110 detects humidity information of an evaporator outlet air (air passed through the evaporator). During the dehumidification operation, the air supply humidity sensor 114 may detect the humidity information of the evaporator outlet air. During the humidification operation, the exhaust air humidity sensor 118 may detect the humidity information of the evaporator outlet air.

The air conditioner may include at least one temperature sensor 120 that detects the temperature of the air. The temperature sensor 120 may detect temperature information of the air processed by the air conditioner.

The at least one temperature sensor 120 may include an indoor air temperature sensor 122 that detects the temperature of the inside air IA sucked from the indoor side I. The indoor air temperature sensor 122 may detect the temperature of the inside air IA in the upstream point on the exhaust air flow path IA-EA in comparison with the heat exchange module 40. The indoor air temperature sensor 122 may be disposed in the inside air chamber 52.

The at least one temperature sensor 120 may include an air supply temperature sensor 124 that detects the temperature of the supplying air SA which is supplied to the indoor side I via the heat exchange module 40. The air supply temperature sensor 124 may detect the temperature of the supplying air SA in the downstream point on the supplying air flow path OA-SA in comparison with the heat exchange module 40. The air supply temperature sensor 124 may be disposed in the air supply chamber 54.

The at least one temperature sensor 120 may include an outdoor air temperature sensor 126 that detects the temperature of the outside air OA that is sucked from the outdoor side O. The outdoor air temperature sensor 126 may detect the temperature of the outside air OA in the upstream point on the supplying air flow path OA-SA in comparison with the heat exchange module 40. The outdoor air temperature sensor 126 may be disposed in the outside air chamber 56.

The at least one temperature sensor 120 may include an exhaust air temperature sensor 128 that detects the temperature of the exhaust air EA which is discharged to the outdoor side O via the heat exchange module 40. The exhaust air temperature sensor 128 may detect the temperature of the exhaust air EA in the downstream point on the exhaust air flow path IA-EA in comparison with the heat exchange module 40.

The at least one temperature sensor 120 may include an indoor air temperature sensor (not shown) that detects the air temperature of the indoor side I. The at least one temperature sensor 120 may include an outdoor air temperature sensor (not shown) that detects the air temperature of the outdoor side O.

The function of the indoor air temperature sensor may be performed by the indoor air temperature sensor 122 or may be performed by a temperature sensor (not shown) which is separately provided in the indoor side I outside the air conditioner.

The function of the outdoor air temperature sensor may be performed by the outdoor air temperature sensor 126 or may be performed by a temperature sensor (not shown) which is separately provided in the outdoor side O outside the air conditioner.

When comparing the outside air temperature and the inside air temperature to select any one of the outside air drying operation mode or the inside air drying operation mode, the control unit 2 may use temperature information of the indoor temperature sensor and the outdoor temperature sensor, and may use temperature information of indoor side I and temperature information of outdoor side O received by a communication module (not shown) provided in the air conditioner.

In the present embodiment, the humidity sensor 110 and the temperature sensor 120 are illustrated separately, but this can be understood that an embodiment in which a single sensor senses both temperature and humidity is also included.

The controller 2 may control the air conditioner based on an input signal of the input unit 3. The controller 2 may control the air conditioner based on a detection signal of the temperature sensor 120. The controller 2 may control the air conditioner based on a detection signal of the humidity sensor 110.

The controller 2 may control to select at least one of a plurality of operation modes based on the input signal and/or the detection signal.

The controller 2 may control the switching function of the refrigerant switching valve 44 so as to select any one of a plurality of heat exchange modes.

The controller 2 may control the operation of the common flow path damper group 62*a*, 62*b*, 64*a*, 64*b*, 66*a*, 66*b*, 68*a*, 68*b* so as to select any one of a plurality of flow path modes.

Referring to FIG. 6A and FIG. 6B, an example of the change of air state on a psychometric chart when an absorbent Ab of the evaporator 41 or 42 adsorbs water W before being saturated and the change of air state on a psychometric chart when the absorbent Ab is saturated will be described as follows.

Referring to FIG. 6A and FIG. 6B, W shows the water adsorbed by the absorbent Ab, and W' shows the condensation water on the outside of the absorbent Ab. On the psychometric chart of FIG. 6A and FIG. 6B, the X-axis (horizontal axis) coordinate indicates a dry bulb temperature Td, the Y-axis (vertical axis) coordinates indicates an absolute humidity Ha, the diagonal coordinate extending from the lower right side to the upper left side indicates a wet bulb temperature Tw, and the curved line coordinate curved and extending from the lower left side to the upper right side indicates a relative humidity Hr. The psychometric chart of FIG. 6A shows a state C1 of the air before passing through the evaporator 41 or 42 and a state C2 of the air after passing through the evaporator 41 or 42. The psychometric chart of FIG. 6B shows a state C3 of the air before passing through the evaporator 41 or 42 and a state C4 of the air after passing through the evaporator 41 or 42.

At least a part of the water in the air (the outside air in the dehumidification operation and the inside air in the humidification operation) passing through any one of the first and second heat exchangers 41 and 42 that serve as the evaporator is adsorbed by the absorbent Ab. As the amount of the water W adsorbed by the absorbent Ab increases, the absorbent Ab becomes closer to the saturated state.

Referring to FIG. 6A, before the absorbent Ab of the evaporator 41 or 42 reaches a saturated state, water in the air is actively absorbed by the absorbent Ab. Even if condensation water is generated locally on the outer surface of the absorbent Ab, condensation water is soon absorbed by the absorbent Ab. Accordingly, the state C2 of the air passed through the evaporator 41 or 42 becomes a state in which the relative humidity is lower than 100%, as in the example of the psychometric chart of FIG. 6A.

Referring to FIG. 6B, when the absorbent Ab of the evaporator 41 or 42 reaches a saturated state, water in the air is no longer absorbed by the absorbent Ab. The water in the air passing through the evaporator 41 or 42 may form condensation water W' on the outer surface of the absorbent Ab. The temperature of the air passed through the evaporator 41 or 42 becomes lower than the dew point temperature, so that the relative humidity becomes 100% and condensation water is generated. The generated condensation water falls to the lower side of the evaporator 41 or 42 and remains inside the air conditioner. The air state in the outlet of the evaporator has a relatively high relative humidity.

The drying operation condition according to an embodiment of the present invention uses the relation between the generation of condensation water in the evaporator 41 or 42 based on FIGS. 6A and 6B and the air state of the evaporator outlet.

Meanwhile, the air conditioner has a plurality of operation modes. The controller 2 controls to select any one of the plurality of operation modes.

The plurality of operation modes include a normal operation mode and a drying operation mode. The plurality of operation modes may further include a ventilation operation mode.

In the normal operation mode, the operation of dehumidifying the air supplied to the room or the operation of humidifying the air supplied to the room may be performed. The controller 2 may control to select any one of a plurality of normal operation modes. The plurality of normal operation modes include a dehumidification operation mode and a humidification operation mode.

In the dehumidification operation mode, among the first and second heat exchangers 41 and 42, a heat exchanger serving as an evaporator is disposed in the supplying air flow path OA-SA. In the dehumidification operation mode, among the first and second heat exchangers 41 and 42, a heat exchanger serving as a condenser is disposed in the exhaust air flow path IA-EA. In the dehumidification operation mode, the outside air OA is deprived of water by the absorbent Ab through the evaporator, and the dehumidified supplying air SA is supplied to the indoor side I. In the dehumidification operation mode, the inside air IA is supplied with water from the absorbent Ab through the condenser, and the humidified exhaust air EA is discharged to the outdoor side O.

The dehumidification operation mode is set, when the first flow path mode and a first heat exchange mode in which the second heat exchanger 42 served as an evaporator are simultaneously set, or when the second flow path mode and a second heat exchange mode in which the first heat exchanger 41 served as an evaporator are simultaneously set. During the dehumidification operation mode, the setting state of the first flow path mode and the first heat exchange mode may be switched to the setting state of the second flow path mode and the second heat exchange mode, and vice versa.

In the humidification operation mode, among the first and second heat exchangers 41 and 42, a heat exchanger serving as a condenser is disposed in the supplying air flow path OA-SA. In the humidification operation mode, among the first and second heat exchangers 41 and 42, a heat exchanger serving an evaporator is disposed in the exhaust air flow path IA-EA. In the humidification operation mode, the outside air OA is supplied with water from the absorbent Ab through the condenser, and the humidified supplying air SA is supplied to the indoor side I. In the humidification operation mode, the inside air IA is deprived of water by the absorbent Ab through the evaporator, and the dehumidified exhaust air EA is discharged to the outdoor side O.

The humidification operation mode is set, when the first flow path mode and a second heat exchange mode in which the second heat exchanger 42 served as a condenser are simultaneously set, or when the second flow path mode and a first heat exchange mode in which the first heat exchanger 41 served as a condenser are simultaneously set. During the humidification operation mode, the setting state of the first flow path mode and the second heat exchange mode may be switched to the setting state of the second flow path mode and the first heat exchange mode, and vice versa.

The controller 2 operates the exhaust fan 20 and the air supply fan 30 in the normal operation mode.

In the ventilation operation mode, in a state where the operation of the heat exchange module 40 is stopped, the outside air OA flows into the indoor side I and the inside air IA flows out to the outdoor side O. In the ventilation operation mode, the exhaust fan 20 and the air supply fan 30 are operated in a state where a non-exchange mode in which the operation of the compressor 45 is turned off is set. In the ventilation operation mode, the exhaust fan 20 and the air supply fan 30 may be operated in a state where the first flow path mode or the second flow path mode is set.

The controller 2 operates the exhaust fan 20 and the air supply fan 30 in the ventilation operation mode.

In the drying operation mode, condensate water W' generated in one of the first and second heat exchangers 41 and 42 served as an evaporator is dried. During the normal operation, the absorbent Ab disposed on the outer surface of one of the first and second heat exchangers 41 and 42 served as an evaporator may be saturated so that condensation water W' may be generated. Even in this case, condensation water W' may be dried by performing the drying operation.

The controller 2 may control to stop the normal operation and perform a drying operation (drying operation mode) during the normal operation, based on certain input information or detection information. In the drying operation mode, the controller 2 controls any one of the first and second heat exchangers 41 and 42 served as an evaporator immediately before the normal operation is stopped to be disposed in the drying flow path. In the drying operation mode, the controller 2 controls to supply air to any one of the first and second heat exchangers 41 and 42 served as an evaporator.

The controller 2 may control to select any one of the plurality of drying operation modes. The plurality of drying operation modes may include an outside air drying operation mode in which the outside air OA is supplied to any one of the first and second heat exchangers 41 and 42 served as an evaporator, and an inside air drying operation mode in which the inside air IA is supplied to any one of the first and second heat exchangers 41 and 42 served as an evaporator.

The controller 2 may control to select any one of a plurality of outside air drying operation modes. The plurality of outside air drying operation modes include a first outside air drying operation mode in which outside air OA is supplied to the first heat exchanger 41 and a second outside air drying operation mode in which the outside air OA is supplied to the second heat exchanger 42.

The controller 2 may control to select any one of a plurality of inside air drying operation modes. The plurality of inside air drying operation modes include a first inside air drying operation mode in which the inside air IA is supplied to the first heat exchanger 41 and a second inside air drying operation mode in which the inside air IA is supplied to the second heat exchanger 42.

When the 'drying flow path mode' and the 'non-exchange mode in which the operation of the heat exchange module 40 is stopped' are simultaneously set, the drying operation mode is set.

The controller 2 operates the exhaust fan 20 in the drying operation mode. The controller 2 stops the air supply fan 30 in the drying operation mode. In the drying operation mode, the air supplied to the heat exchanger 41 or 42 is discharged to the outdoor side O.

The outside air OA supplied to the heat exchanger 41 or 42 is discharged to the outdoor side O during the outside air drying operation. The inside air IA supplied to the heat exchanger 41 or 42 during the inside air drying operation is discharged to the outdoor side.

The outside air OA supplied to the heat exchanger 41 or 42 during the first and second outside air drying operations is discharged to the outdoor side O. The inside air IA supplied to the heat exchanger 41 or 42 during the first and second air drying operations is discharged to the outdoor side.

Meanwhile, the air conditioner has a plurality of flow path modes. The controller 2 may control to select any one of the plurality of flow path modes.

In the normal operation mode, the controller 2 may control to select any one of the plurality of flow path modes. Among the humidification operation mode, any one of different flow path modes may be selected, or a different flow path modes may be alternated.

The plurality of flow path modes include a first flow path mode in which the first common flow path 11 constitutes a part of the exhaust air flow path IA-EA and the second common flow path 12 constitutes a part of the supplying air flow path OA-SA, and a second flow path mode in which the first common flow path 11 constitutes a part of the supplying air flow paths OA-SA and the second common flow path 12 constitutes a part of the exhaust air flow path IA-EA.

During the normal operation, the controller 2 i) controls the common flow path damper group 62a, 62b, 64a, 64b, 66a, 66b, 68a, 68b to be the first flow path mode, or ii) controls the common flow path damper group 62a, 62b, 64a, 64b, 66a, 66b, 68a, 68b to be the second flow path mode.

In the first flow path mode with reference to FIG. 4A, the first inside air damper 62a, the first exhaust air damper 68a, the second outside air damper 66b, and the second air supply damper 64b are opened, and the second inside air damper 62b, the second exhaust air damper 68b, the first outside air damper 66a, and the first air supply damper 64a are closed.

In the second flow path mode with reference to FIG. 4B, the first inside air damper 62a, the first exhaust air damper 68a, the second outside air damper 66b, and the second air supply damper 64b are closed, and the second inside air damper 62b, the second exhaust air damper 68b, the first outside air damper 66a, and the first air supply damper 64a are opened.

The controller 2 may control the switching (change) between the first flow path mode and the second flow path mode, during the normal operation (during humidification operation or dehumidification operation). This switching between the first flow path mode and the second flow path mode may be referred to as 'flow path switching'.

In the drying operation mode, the controller 2 may control to select any one of a plurality of flow path modes. Specifically, depending on which one is selected from among the plurality of drying operation modes, any one mode may be selected from among different flow path modes.

Specifically, when the first outside air drying mode is selected, the first outside air drying flow path mode is selected. When the second outside air drying mode is selected, the second outside air drying flow path mode is selected. When the first inside air drying mode is selected, the first inside air drying flow path mode is selected. When the second inside air drying mode is selected, the second inside air drying flow path mode is selected.

During the drying operation, the controller 2 i) controls the common flow path damper group 62a, 62b, 64a, 64b, 66a, 66b, 68a, 68b to be the outside air drying flow path mode, or ii) controls the common flow path damper group 62a, 62b, 64a, 64b, 66a, 66b, 68a, 68b to be the inside air drying flow path mode.

During the drying operation, the controller 2 i) controls the common flow path damper group 62a, 62b, 64a, 64b, 66a, 66b, 68a, 68b to be the first outside air drying flow path mode, ii) controls the common flow path damper group 62a, 62b, 64a, 64b, 66a, 66b, 68a, 68b to be the second outside air drying flow path mode, iii) controls the common flow path damper group 62a, 62b, 64a, 64b, 66a, 66b, 68a, 68b to be the first inside air drying flow path mode, or iv) controls the common flow path damper group 62a, 62b, 64a, 64b, 66a, 66b, 68a, 68b to be the second inside air drying flow path mode.

In the first outside air drying flow path mode with reference to FIG. 9A, the first inside air damper 62a and the first air supply damper are closed, and the first outside air damper 66a and the first exhaust air damper 68a are opened. In the first outside air drying flow path mode, the second inside air damper 62b, the second air supply damper, the second outside air damper 66b, and the second exhaust air damper 68b may be closed. The exhaust fan 20 operates in the first outside air drying flow path mode. The air supply fan 30 may be stopped in the first outside air drying flow path mode.

In the second outside air drying flow path mode with reference to FIG. 9B, the second inside air damper 62b and the second air supply damper are closed, and the second outside air damper 66b and the second exhaust air damper 68b are opened. In the second outside air drying flow path mode, the first inside air damper 62a, the first air supply damper, the first outside air damper 66a, and the first exhaust air damper 68a may be closed. The exhaust fan 20 operates in the second outside air drying flow path mode. The air supply fan 30 may be stopped in the second outside air drying flow path mode.

In the first inside air drying flow path mode with reference to FIG. 10A, the first outside air damper 66a and the first air supply damper 64a are closed, and the first inside air damper 62a and the first exhaust air damper 68a are opened. In the first inside air drying flow path mode, the second outside air damper 66b, the second air supply damper 64b, the second inside air damper 62b, and the second exhaust air damper 68b may be closed. The exhaust fan 20 operates in the first inside air drying flow path mode. The air supply fan 30 may be stopped in the first inside air drying flow path mode.

In the second inside air drying flow path mode with reference to FIG. 10B, the second outside air damper 66b and the second air supply damper 64b are closed, and the second inside air damper 62b and the second exhaust air damper 68b are opened. In the second inside air drying flow path mode, the first outside air damper 66a, the first air supply damper 64a, the first inside air damper 62a, and the first exhaust air damper 68a may be closed. The exhaust fan 20 operates in the second inside air drying flow path mode. The air supply fan 30 may be stopped in the second inside air drying flow path mode.

Meanwhile, the air conditioner has a plurality of heat exchange modes. The controller 2 may control to select any one of the plurality of heat exchange modes.

The plurality of heat exchange modes include a first heat exchange mode (see FIG. 4B) in which the first heat exchanger 41 serves as a condenser and a second heat exchange mode (see FIG. 4B) in which the second heat exchanger 42 serves as a condenser. The plurality of heat exchange modes may further include non-exchange mode for stopping the operation of the compressor 45. In the first heat exchange mode, the second heat exchanger 42 serves as an evaporator. In the second heat exchange mode, the first heat exchanger 41 serves as an evaporator.

In the normal operation mode, one of the first and second heat exchangers 41 and 42 served as an evaporator and the other served as a condenser. That is, in the normal operation mode, one of the first heat exchange mode and the second heat exchange mode is selected.

In the normal operation mode (during humidification operation or dehumidification operation), the switching (change) between the first heat exchange mode and the second heat exchange mode may be performed. This switching between the first heat exchange mode and the second heat exchange mode may be referred to as 'refrigerant switching'.

In the normal operation mode (during humidification operation or dehumidification operation), the flow path switching and the refrigerant switching may be controlled to be performed simultaneously. During the normal operation, the simultaneous performance of the flow path switching and the refrigerant switching may be referred to as 'cycle switching'. The cycle switching may be controlled to be repeatedly performed at intervals, in a state where the humidification operation mode or the dehumidification operation mode is maintained.

In the drying operation mode, any one of the plurality of drying flow path modes is controlled to be selected. Further, in the drying operation mode, the non-exchange mode is controlled to be selected.

The controller 2 may control to simultaneously select 'any one of the plurality of flow path modes' and 'any one of the plurality of heat exchange modes'. The selection of any one of the plurality of operation modes may be performed by a combination of the selection of any one of a plurality of heat exchange modes and the selection of any one of a plurality of flow path modes.

A control method of the air conditioner according to the embodiments of the present invention will be described with reference to FIGS. 7 and 8. In the flowcharts, the overlapped content is denoted by the same reference numeral, and an overlapped description is omitted. The control method may be performed by the controller 2.

The present invention may be a computer program including each step of the control method, or may be a recording medium on which a program for implementing the control method by a computer is recorded. The 'recording medium' means a computer-readable recording medium. The recording medium includes all types of recording apparatuses in which data that may be read by a computer is stored. Examples of the computer-readable recording medium include a ROM, a RAM, a CD-ROM, a magnetic tape, a floppy disk, an optical data storage apparatus, and the like, and a carrier wave such as transmission over the Internet. In addition, the computer-readable recording medium may be distributed over a network-connected computer system so that computer readable code may be stored and executed in a distributed manner.

Each step of flowcharts of the control method and the combinations of flowcharts may be performed by computer program instructions. The instructions may be installed in a general purpose computer or a special purpose computer, and the instructions create means for performing the functions described in the flowchart step(s).

In addition, it is also possible that, in some embodiments, the functions mentioned in the steps occur out of order. For example, two steps shown in succession can actually be performed substantially simultaneously, or the steps can, sometimes, be performed in reverse order according to a corresponding function.

The control method according to an embodiment will be described with reference to FIG. 7.

The control method includes a step S50 of performing the normal operation.

The control method includes a step S20 of determining whether a certain drying operation condition is satisfied during normal operation S50. In the determination step S20, the humidity information of the air is detected. The determination step S20 is performed during the normal operation S50. That is, during the normal operation, the humidity information of the air is detected, and it is determined whether the drying operation condition is satisfied based on the detected humidity information. In the step S20, the humidity information of the air passed through any one serving as the evaporator 41 or 42 is detected, and it is determined whether the drying operation condition is satisfied based on the detected humidity information.

The controller 2 may determine whether the drying operation condition is satisfied based on the humidity information of the evaporator outlet air. The controller 2 may determine the drying operation condition based on the humidity information of the exhaust air humidity sensor 118 and the air supply humidity sensor.

When the drying operation condition is unsatisfied in the step S20, the normal operation is maintained. After step S50, the determination step S20 is performed continuously during normal operation.

When the drying operation condition is satisfied in the determination step S20, the normal operation S50 is stopped, and drying operation steps S41 and S43 are performed to perform the drying operation (drying operation mode). In the drying steps S41 and S43, air is supplied to the heat exchanger serving as the evaporator 41 or 42 of the step S50.

The control method may further include a comparison step (S30) of comparing the outside air temperature and the inside air temperature. The comparison step S30 may proceed before the drying steps S41 and s43. In the present embodiment, the comparison step S30 is performed after the drying operation condition is satisfied in the determination step S20, but may performed during the normal operation S20.

When it is determined, in the comparison step S30, that the outside air temperature is higher than the inside air temperature, a step S41 is performed so that outside air drying operation (outside air drying operation mode) for supplying outside air OA to the evaporator 41 or 42 is performed (See FIGS. 9A and 9B).

When it is determined, in the comparison step S30, that the inside air temperature is higher than the outside air temperature, a step S43 is performed so that the inside air drying operation (inside air drying operation mode) for supplying the inside air IA to the evaporator 41 or 42 is performed (See FIGS. 10A and 10B).

Figure 7:
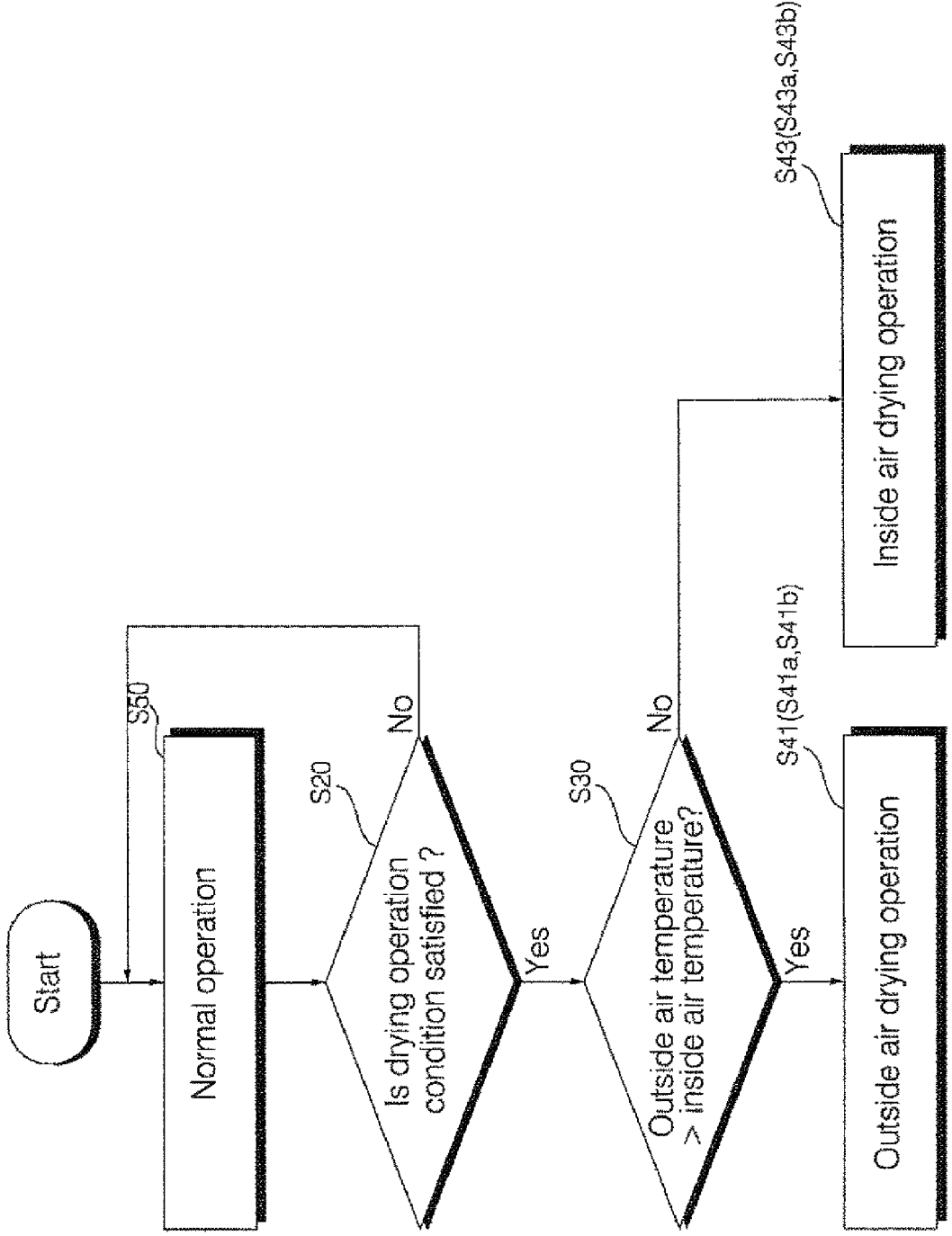
FIG. 7 is a flowchart showing a control method of an air conditioner according to an embodiment of the present invention.
Figure 8:
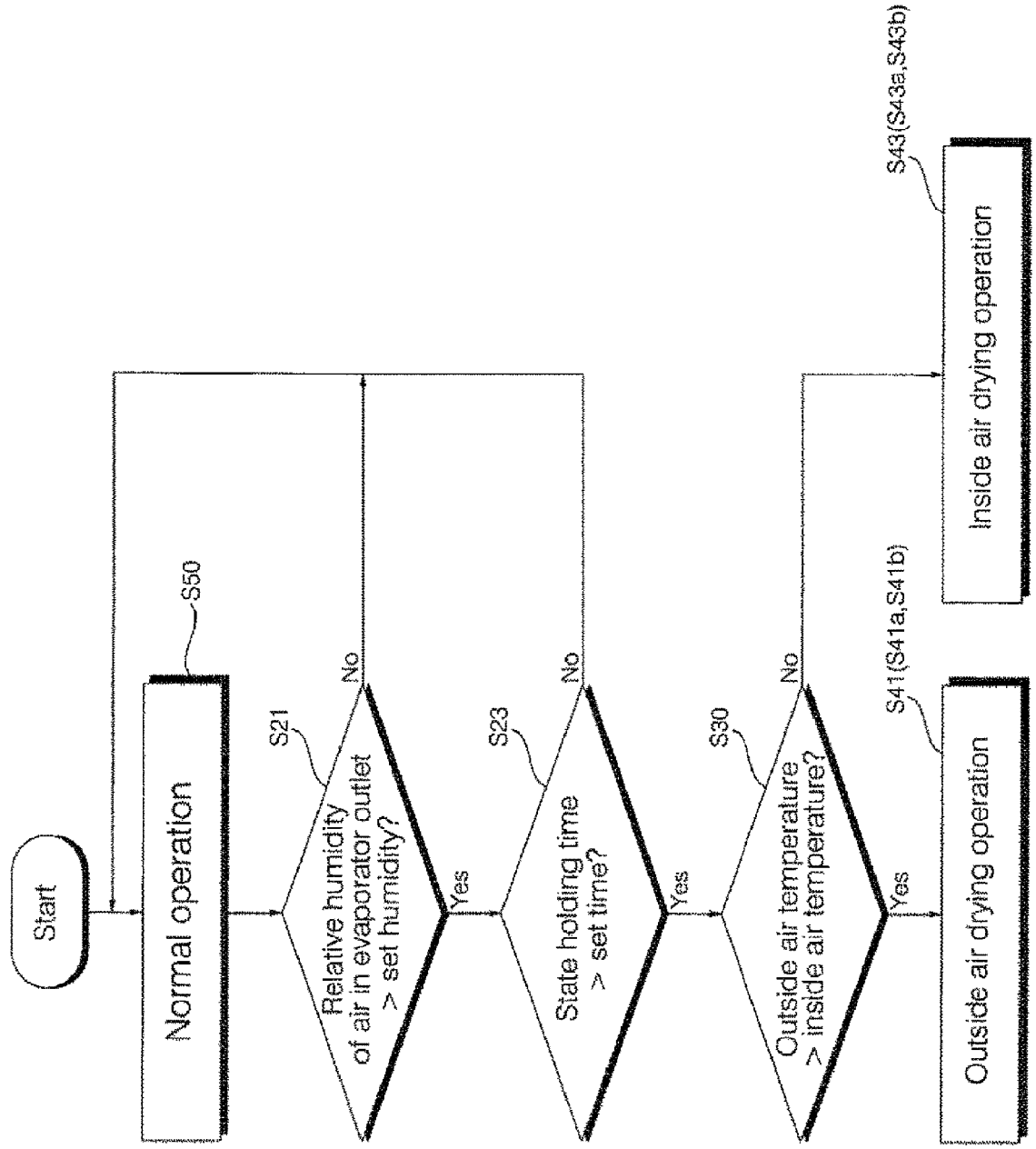
FIG. 8 is a flowchart showing a control method of an air conditioner according to another embodiment of the present invention.

Although not shown in FIGS. 7 and 8, the control method includes an evaporator determination process that determines which of the first and second heat exchangers 41 and 42 served as an evaporator at the time when the drying operation condition is satisfied.

When it is determined, in the evaporator determination process, that the first heat exchanger served as an evaporator, the step of performing the first drying operation (S41a, S43a) for supplying air to the first heat exchanger 41 proceeds (See FIGS. 9A and 10A).

When it is determined, in the evaporator determination process, that the second heat exchanger served as an evaporator, the step of performing the second drying operation (S41b, S43b) for supplying air to the second heat exchanger 42 proceeds (See FIGS. 9B and 10B).

A control method according to another embodiment will be described with reference to FIG. 8. In the flowchart of FIG. 8, the same content as those in the flowchart of FIG. 7 is denoted by the same reference numeral, and an overlapped explanation is omitted.

Referring to FIG. 8, the drying operation condition may include a humidity condition which is previously set to be satisfied when the relative humidity of the air passed through any one serving as the evaporator 41 or 42 exceeds a certain value (S21).

Here, 'the drying operation condition includes the humidity condition' means that both the case where the drying operation condition is constituted by only the humidity condition and the case where the drying operation condition includes not only the humidity condition but also other condition or other conditions are included. Further, when the drying operation condition includes the humidity condition and other condition Co, the drying operation condition may be constituted by the union condition (OR condition) of the humidity condition and other condition Co, or may be constituted by the intersection condition (AND condition) of the humidity condition and other condition Co.

Referring to FIG. 8, the drying operation condition may include a time condition in which the holding time of the state satisfying the humidity condition exceeds a set time (S23).

In the present embodiment (FIG. 8), it is shown that the drying operation condition is satisfied when both the humidity condition and the time condition are satisfied. However, in another example, the drying operation condition can be satisfied when only the humidity condition is satisfied without the time condition.

Referring to FIG. 8, the control method may include a step S21 of determining whether the humidity condition is satisfied during normal operation S50. In step S21, it is determined whether the detected relative humidity of the air in the outlet side of the evaporator 41 or 42 exceeds a certain value (set humidity).

When it is determined, in the step S21, that the humidity condition is unsatisfied, the normal operation is maintained. After the step S50, the step S21 is performed continuously during normal operation.

When it is determined, in the step S21, that the humidity condition is satisfied, a process S23 of determining whether the holding time of the state in which the humidity condition is satisfied exceeds a set time is performed. It is possible to periodically or continuously detect whether the humidity condition is satisfied based on the humidity information updated and detected in the step S23. Accordingly, the step S21 may be continuously performed based on the humidity information of different points of time during the process S23. Through the process S23, the humidity condition may be temporarily satisfied even though condensation water is not generated in the evaporator 41 or 42, so that the probability of unnecessarily proceeding the drying operation can be reduced.

When it is determined, in the step S23, that the time condition is satisfied, the drying step S41, s43 for performing the drying operation is performed. The control method may further include the comparison step S30 that is performed before the drying step S41, s43. The control method may further include the evaporator determination process performed before the drying step S41, s43.

The controller 2 may select any one of a plurality of drying operation modes according to the higher temperature by comparing the outside air temperature and the inside air temperature.

In the drying step, when the outside air temperature is higher than the inside air temperature, the outside air drying operation for supplying outside air may be performed. In the drying step, when the inside air temperature is higher than the outside air temperature, the inside air drying operation for supplying the inside air may be performed.

The controller 2 may compare the outside air temperature and the inside air temperature, and control the plurality of dampers according to the higher temperature.

Referring to FIG. 9A and FIG. 9B, when the outside air temperature is higher than the inside air temperature, during the drying operation, the controller 2 controls to i) close the first inside air damper 62a and the first air supply damper 64a, and open the first outside air damper 66a and the first air exhaust air damper 68a, or ii) close the second inside air damper 62b and the second air supply damper 64b, and open the second outside air damper 66b and the second air exhaust air damper 68b.

Referring to FIG. 10A and FIG. 10B, when the inside air temperature is higher than the outside air temperature, during the drying operation, the controller 2 controls to i) close the first outside air damper 66a and the first air supply damper 64a, and open the first inside air damper 62a and the first air exhaust air damper 68a, or ii) close the second outside air damper 66b and the second air supply damper 64b, and open the second inside air damper 62b and the second air exhaust air damper 68b.

The controller 2 may select one of a plurality of drying operation modes depending on which heat exchanger 41 or 42 served as an evaporator at the time when the drying operation condition is satisfied.

The controller 2 may control the first and second heat exchangers 41 and 42 to serve as a condenser and an evaporator alternately during the normal operation, and this may be referred to as a 'cycle switching operation'. The heat exchanger served as the evaporator at the time when the drying operation condition is satisfied during the cycle switching operation is the first heat exchanger 41 or the second heat exchanger 42 depending on the situation. The controller 2 may control to supply air to any one of the first heat exchanger 41 and the second heat exchanger 42 served as an evaporator at the time when the drying operation condition is satisfied, during the drying operation.

In the drying step, when the first heat exchanger 41 served as an evaporator at the time when the drying operation condition is satisfied, the first drying operation for supplying air to the first heat exchanger 41 may be performed.

In the drying step, when the second heat exchanger 42 served as an evaporator at the time when the drying operation condition is satisfied, the second drying operation for supplying air to the second heat exchanger 42 may be performed.

The controller 2 may control the plurality of dampers according to the heat exchanger 41 or 42 which served as the evaporator at the time when the drying operation condition is satisfied.

Referring to FIG. 9A and FIG. 10A, when the first heat exchanger 41 served as an evaporator at the time when the drying operation condition is satisfied, during the drying operation, the controller 2 controls to i) close the first inside air damper 62a and the first air supply damper 64a, and open the first outside air damper 66*a* and the first air exhaust air damper 68*a*, or ii) close the first outside air damper 66*a* and the first air supply damper 64*a*, and open the first inside air damper 62*a* and the first air exhaust air damper 68*a*.

Referring to FIG. 9B and FIG. 10B, when the second heat exchanger 42 served as an evaporator at the time when the drying operation condition is satisfied, during the drying operation, the controller 2 controls to i) close the second inside air damper 62*b* and the second air supply damper 64*b*, and open the second outside air damper 66*b* and the second air exhaust air damper 68*b*, or ii) close the second outside air damper 66*b* and the second air supply damper 64*b*, and open the second inside air damper 62*b* and the second air exhaust air damper 68*b*.

The controller 2 may select any one of a plurality of drying operation modes by combining (four cases) two cases depending on the heat exchanger 41 or 42 served as an evaporator at the time when the drying operation condition is satisfied, and two cases depending on the higher temperature by comparing the outside air temperature and the inside air temperature.

(I) In the drying step, when the first heat exchanger 41 served as an evaporator at the time when the drying operation condition is satisfied, when the outside air temperature is higher than the inside air temperature, the first outside air drying operation for supplying the outside air OA to the first heat exchanger 41 may be performed.

(II) In the drying step, when the second heat exchanger 42 served as an evaporator at the time when the drying operation condition is satisfied, when the outside air temperature is higher than the inside air temperature, the second outside air drying operation for supplying the outside air OA to the second heat exchanger 42 may be performed.

(III) In the drying step, when the first heat exchanger 41 served as an evaporator at the time when the drying operation condition is satisfied, when the inside air temperature is higher than the outside air temperature, the first outside air drying operation for supplying the inside air IA to the first heat exchanger 41 may be performed.

(IV) In the drying step, when the second heat exchanger 42 served as an evaporator at the time when the drying operation condition is satisfied, when the inside air temperature is higher than the outside air temperature, the first outside air drying operation for supplying the inside air IA to the second heat exchanger 42 may be performed.

The controller 2 may control the plurality of dampers by combining (four cases) two cases depending on the heat exchanger 41 or 42 served as an evaporator at the time when the drying operation condition is satisfied, and two cases depending on the higher temperature by comparing the outside air temperature and the inside air temperature.

Referring to FIG. 9A, when the first heat exchanger 41 served as an evaporator at the time when the drying operation condition is satisfied, when the outside air temperature is higher than the inside air temperature, the controller 2 may control to close the first inside air damper 62*a* and the first air supply damper 64*a* and to open the first outside air damper 66*a* and the first exhaust air damper 68*a* during the drying operation (first outside air drying flow path mode).

Referring to FIG. 9B, when the second heat exchanger 42 served as an evaporator at the time when the drying operation condition is satisfied, when the outside air temperature is higher than the inside air temperature, the controller 2 may control to close the second inside air damper 62*b* and the second air supply damper 64*b* and to open the second outside air damper 66*b* the second exhaust air damper 68*b* during the drying operation (second outside air drying flow path mode).

Referring to FIG. 10A, when the first heat exchanger 41 served as an evaporator at the time when the drying operation condition is satisfied, when the inside air temperature is higher than the outside air temperature, the controller 2 may control to close the first outside air damper 66*a* and the first air supply damper 64*a* and to open the first inside air damper 62*a* and the first exhaust air damper 68*a* during the drying operation (first inside air drying flow path mode).

Referring to FIG. 10B, when the second heat exchanger 42 served as an evaporator at the time when the drying operation condition is satisfied, when the inside air temperature is higher than the outside air temperature, the controller 2 may control to close the second outside air damper 66*b* and the second air supply damper 64*b* and to open the second inside air damper 62*b* the second exhaust air damper 68*b* during the drying operation (second inside air drying flow path mode).

The invention claimed is:

1. An air conditioner, comprising:
    a heat exchange module comprising a compressor in which a refrigerant circulates, a first heat exchanger, an expansion valve, a second heat exchanger, and an absorbent disposed on an outer surface of the first heat exchanger and the second heat exchanger;
    at least one humidity sensor;
    at least one temperature sensor; and
    a controller which controls to stop a normal operation and perform a drying operation for supplying air to any one of the first heat exchanger and the second heat exchanger serving as an evaporator when it is determined that a predetermined drying operation condition is satisfied based on humidity information of air passed through the any one of the first heat exchanger and the second heat exchanger serving as the evaporator during the normal operation in which the any one of the first heat exchanger and the second heat exchanger serves as an evaporator and the other serves as a condenser,
    wherein the controller controls to:
        perform a first outside air drying operation for supplying air to the first heat exchanger if an outside air temperature is higher than an inside air temperature, when the first heat exchanger is serving as an evaporator at a time when the predetermined drying operation condition is satisfied;
        perform a second outside air drying operation for supplying air to the second heat exchanger if the outside air temperature is higher than the inside air temperature, when the second heat exchanger is serving as an evaporator at the time when the predetermined drying operation condition is satisfied;
        perform a first inside air drying operation for supplying air to the first heat exchanger if the inside air temperature is higher than the outside air temperature, when the first heat exchanger is serving as an evaporator at the time when the predetermined drying operation condition is satisfied; and
        perform a second inside air drying operation for supplying air to the second heat exchanger if the inside air temperature is higher than the outside air temperature, when the second heat exchanger is serving as an evaporator at the time when the predetermined drying operation condition is satisfied.

2. The air conditioner of claim 1, wherein the predetermined drying operation condition comprises a humidity condition which is previously set to be satisfied when a relative humidity of the air passed through the any one of the first heat exchanger and the second heat exchanger serving as the evaporator exceeds a predetermined value.

3. The air conditioner of claim 2, wherein the predetermined drying operation condition comprises a time condition in which a holding time of a state of satisfying the humidity condition exceeds a set time.

4. The air conditioner of claim 1, further comprising an input unit that receives an instruction from a user for controlling the normal operation and the drying operation of the air conditioner.

5. The air conditioner of claim 1, wherein the outside air supplied during the first and second outside air drying operations is discharged to an outdoor side and the inside air supplied during the first and second inside air drying operations is discharged to the outdoor side.

6. The air conditioner of claim 1, wherein the controller controls the first heat exchanger and the second heat exchanger to serve as a condenser and an evaporator alternately in the normal operation and controls to supply air to any one of the first heat exchanger and the second heat exchanger which served as the evaporator when the predetermined drying operation condition is satisfied in the drying operation.

7. The air conditioner of claim 6, wherein the heat exchange module further comprises a refrigerant switching valve, and wherein the controller controls the refrigerant switching valve to control the first heat exchanger and the second heat exchanger to serve as the condenser and the evaporator alternately in the normal operation.

8. The air conditioner of claim 1, further comprising:
a first common flow path in which the first heat exchanger is disposed;
a second common flow path in which the second heat exchanger is disposed;
an outside air chamber into which an outside air flows into an inside;
an air supply chamber through which a supplying air flows out to an indoor side from an inside;
an inside air chamber into which an inside air flows into an inside;
an exhaust air chamber through which an exhaust air flows out to an outdoor side from an inside;
a first inside air damper which opens and closes a connection between the first common flow path and the inside air chamber;
a first exhaust air damper which opens and closes a connection between the first common flow path and the exhaust air chamber;
a first outside air damper which opens and closes a connection between the first common flow path and the outside air chamber;
a first air supply damper which opens and closes a connection between the first common flow path and the air supply chamber;
a second inside air damper which opens and closes a connection between the second common flow path and the inside air chamber;
a second exhaust air damper which opens and closes a connection between the second common flow path and the exhaust air chamber;
a second outside air damper which opens and closes a connection between the second common flow path and the outside air chamber; and
a second air supply damper which opens and closes a connection between the second common flow path and the exhaust air chamber.

9. The air conditioner of claim 8, wherein the controller, during the normal operation, controls to:
open the first inside air damper, the first exhaust air damper, the second outside air damper, and the second air supply damper, and close the second inside air damper, the second exhaust air damper, the first outside air damper, and the first air supply damper; or
close the first inside air damper, the first exhaust air damper, the second outside air damper, and the second air supply damper, and open the second inside air damper, the second exhaust air damper, the first outside air damper, and the first air supply damper, and wherein the controller, during the drying operation, controls to:
close the first inside air damper and the first air supply damper and open the first outside air damper and the first exhaust air damper;
close the second inside air damper and the second air supply damper and open the second exhaust air damper and the second exhaust air damper;
close the first outside air damper and the first air supply damper and open the first inside air damper and the first exhaust air damper; or
close the second outside air damper and the second air supply damper and open the second inside air damper and the second exhaust air damper.

10. The air conditioner of claim 9, further comprising:
an exhaust fan which is disposed in the exhaust air chamber; and
an air supply fan which is disposed in the air supply chamber, wherein the controller controls, during the normal operation, the exhaust fan and the air supply fan to operate, and controls, during the drying operation, the exhaust fan to operate and to stop the air supply fan.

11. The air conditioner of claim 8, wherein the controller, when the first heat exchanger is serving as an evaporator at a time when the predetermined drying operation condition is satisfied, during the drying operation, controls to close the first inside air damper and the first air supply damper and open the first outside air damper and the first exhaust air damper, or controls to close the first outside air damper and the first air supply damper and open the first inside air damper and the first exhaust air damper, and wherein the controller, when the second heat exchanger is serving as an evaporator at the time when the predetermined drying operation condition is satisfied, during the drying operation, controls to close the second inside air damper and the second air supply damper and open the second outside air damper and the second exhaust air damper, or controls to close the second outside air damper and the second air supply damper and open the second inside air damper and the second exhaust air damper.

12. The air conditioner of claim 8, wherein the controller, when the first heat exchanger is serving as an evaporator at a time when the predetermined drying operation condition is satisfied, and when the outside air temperature is higher than the inside air temperature, during the drying operation, controls to close the first inside air damper and the first air supply damper and open the first outside air damper and the first exhaust air damper, wherein the controller, when the second heat exchanger is serving as an evaporator at the time when the predetermined drying operation condition is satisfied, and when the outside air temperature is higher than the inside air temperature, during the drying operation, controls to close the second inside air damper and the second air supply damper and open the second outside air damper and the second exhaust air damper, wherein the controller, when the first heat exchanger is serving as an evaporator at the time when the predetermined drying operation condition is satisfied, when the inside air temperature is higher than the outside air temperature, during the drying operation, controls to close the first outside air damper and the first air supply damper and open the first inside air damper and the first exhaust air damper, and wherein the controller, when the second heat exchanger is serving as an evaporator at the time when the predetermined drying operation condition is satisfied, and when the inside air temperature is higher than the outside air temperature, during the drying operation, controls to close the second outside air damper and the second air supply damper and open the second inside air damper and the second exhaust air damper.

13. The air conditioner of claim 8, wherein the controller, when the outside air temperature is higher than the inside air temperature, during the drying operation, controls to:
   close the first inside air damper and the first air supply damper and open the first outside air damper and the first exhaust air damper; or
   close the second inside air damper and the second air supply damper and open the second outside air damper and the second exhaust air damper, and wherein the controller, when the inside air temperature is higher than the outside air temperature, during the drying operation, controls to:
      close the first outside air damper and the first air supply damper and open the first inside air damper and the first exhaust air damper; or
      close the second outside air damper and the second air supply damper and open the second inside air damper and the second exhaust air damper.

14. The air conditioner of claim 1, wherein the at least one humidity sensor comprises:
   an exhaust air humidity sensor that detects a humidity of exhaust air discharged to an outdoor side through the heat exchange module; and
   an air supply humidity sensor that detects a humidity of air supplied to an indoor side through the heat exchange module, and wherein the controller determines whether the predetermined drying operation condition is satisfied based on humidity information of the exhaust air humidity sensor and the air supply humidity sensor.

15. A method of controlling an air conditioner comprising a compressor in which a refrigerant circulates, a first heat exchanger, an expansion valve, a second heat exchanger, and an absorbent disposed on an outer surface of the first heat exchanger and the second heat exchanger, the method comprising:
   during a normal operation in which any one of the first heat exchanger and the second heat exchanger serves as an evaporator and the other serves as a condenser, detecting humidity information of an air passed through the any one of the first heat exchanger and the second heat exchanger serving as an evaporator, and determining whether a predetermined drying operation condition is satisfied based on the detected humidity information; and
   stopping the normal operation when the predetermined drying operation condition is satisfied and performing a drying operation for supplying air to the any one of the first heat exchanger and the second heat exchanger serving as an evaporator, wherein an operation of the compressor is turned off in the drying operation, and wherein, in the performing of the drying operation, when the first heat exchanger is serving as an evaporator at a time when the predetermined drying operation condition is satisfied, if an outside air temperature is higher than an inside air temperature, a first outside air drying operation for supplying air to the first heat exchanger is performed;
   when the second heat exchanger is serving as an evaporator at the time when the predetermined drying operation condition is satisfied, if the outside air temperature is higher than the inside air temperature, a second outside air drying operation for supplying air to the second heat exchanger is performed;
   when the first heat exchanger served as an evaporator at the time when the predetermined drying operation condition is satisfied, if the inside air temperature is higher than the outside air temperature, a first inside air drying operation for supplying air to the first heat exchanger is performed; and
   when the second heat exchanger served as an evaporator at the time when the predetermined drying operation condition is satisfied, if the inside air temperature is higher than the outside air temperature, a second inside air drying operation for supplying air to the second heat exchanger is performed.

16. The method of claim 15, wherein the normal operation is maintained when the predetermined drying operation condition is not satisfied.

17. The method of claim 15, wherein, in the performing of the drying operation, when the first heat exchanger is serving as an evaporator at a time when the predetermined drying operation condition is satisfied, a first drying operation for supplying air to the first heat exchanger is performed, and when the second heat exchanger is serving as an evaporator at the time when the predetermined drying operation condition is satisfied, a second drying operation for supplying air to the second heat exchanger is performed.

* * * * *